US008235804B2

(12) United States Patent
Gagner et al.

(10) Patent No.: US 8,235,804 B2
(45) Date of Patent: Aug. 7, 2012

(54) WAGERING GAME

(75) Inventors: Mark B. Gagner, West Chicago, IL (US); Anthony Prohl, Romeoville, IL (US); Gene Rigsby, Chicago, IL (US); Patrick Schaefer, Chicago, IL (US); Ian Simmons, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 298 days.

(21) Appl. No.: 12/600,148

(22) PCT Filed: May 7, 2008

(86) PCT No.: PCT/US2008/005910

§ 371 (c)(1), (2), (4) Date: Nov. 13, 2009

(87) PCT Pub. No.: WO2008/143790

PCT Pub. Date: Nov. 27, 2008

(65) Prior Publication Data

US 2010/0291993 A1 Nov. 18, 2010

Related U.S. Application Data

(60) Provisional application No. 60/930,080, filed on May 14, 2007, provisional application No. 61/002,703, filed on Nov. 9, 2007.

(51) Int. Cl.
*G06F 17/00* (2006.01)

(52) U.S. Cl. .......................................................... 463/25

(58) Field of Classification Search .............. 463/16–25, 463/31, 37

See application file for complete search history.

(56) References Cited

U.S. PATENT DOCUMENTS

| | | | |
|---|---|---|---|
| 4,624,459 | A | 11/1986 | Kaufman |
| 4,837,728 | A | 6/1989 | Barrie et al. |
| 4,948,134 | A | 8/1990 | Suttle et al. |
| 5,116,055 | A | 5/1992 | Tracy |
| 5,249,800 | A | 10/1993 | Hilgendorf et al. |
| 5,275,400 | A | 1/1994 | Weingardt et al. |
| 5,280,909 | A | 1/1994 | Tracy |
| 5,344,144 | A | 9/1994 | Canon |

(Continued)

FOREIGN PATENT DOCUMENTS

DE 19624321 3/2002

(Continued)

OTHER PUBLICATIONS

Written Opinion corresponding to co-pending International Patent Application Serial No. PCT/US2008/005910, European Patent Office; dated Sep. 5, 2008; 7 pages.

(Continued)

*Primary Examiner* — Ronald Laneau

(74) *Attorney, Agent, or Firm* — Nixon Peabody LLP

(57) ABSTRACT

A method of conducting a community-based wagering game event includes the acts of displaying images associated with a community-based wagering game on a surface, sensing a player's movement using a sensing device, the player's movement comprising a game input, and outputting to a controller a signal bearing data relating to the player's movement. The method also includes the acts of determining, using the controller, a relation between the player's movement and the displayed images on the surface and adapting the displayed images responsive to the player's movement.

25 Claims, 9 Drawing Sheets

U.S. PATENT DOCUMENTS

| | | | |
|---|---|---|---|
| 5,377,973 | A | 1/1995 | Jones et al. |
| 5,393,057 | A | 2/1995 | Marnell, II |
| 5,524,888 | A | 6/1996 | Heidel |
| 5,544,892 | A | 8/1996 | Breeding |
| 5,564,700 | A | 10/1996 | Celona |
| 5,580,063 | A | 12/1996 | Edwards |
| 5,580,309 | A | 12/1996 | Piechowiak et al. |
| 5,611,730 | A | 3/1997 | Weiss |
| 5,645,486 | A | 7/1997 | Nagao et al. |
| 5,655,961 | A | 8/1997 | Acres et al. |
| 5,766,076 | A | 6/1998 | Pease et al. |
| RE35,864 | E | 7/1998 | Weingardt |
| 5,779,549 | A | 7/1998 | Walker et al. |
| 5,816,918 | A | 10/1998 | Kelly et al. |
| 5,823,874 | A | 10/1998 | Adams |
| 5,830,063 | A | 11/1998 | Byrne et al. |
| 5,848,932 | A | 12/1998 | Adams |
| 5,855,515 | A | 1/1999 | Pease et al. |
| 5,876,284 | A | 3/1999 | Acres et al. |
| 5,885,158 | A | 3/1999 | Torango et al. |
| 5,941,773 | A | 8/1999 | Harlick |
| 5,975,528 | A | 11/1999 | Halaby |
| 6,007,427 | A | 12/1999 | Wiener et al. |
| 6,012,982 | A | 1/2000 | Piechowiak et al. |
| 6,039,648 | A | 3/2000 | Guinn et al. |
| 6,047,963 | A | 4/2000 | Pierce et al. |
| 6,077,162 | A | 6/2000 | Weiss |
| 6,089,977 | A | 7/2000 | Bennett |
| 6,089,980 | A | 7/2000 | Gauselmann et al. |
| 6,102,474 | A | 8/2000 | Daley |
| 6,102,798 | A | 8/2000 | Bennett et al. |
| 6,102,799 | A | 8/2000 | Stupak |
| 6,110,043 | A | 8/2000 | Olsen |
| 6,139,013 | A | 10/2000 | Pierce et al. |
| 6,142,872 | A | 11/2000 | Walker et al. |
| 6,146,273 | A | 11/2000 | Olsen |
| 6,155,925 | A | 12/2000 | Giobbi et al. |
| 6,158,741 | A | 12/2000 | Koelling |
| 6,159,097 | A | 12/2000 | Gura |
| 6,168,523 | B1 | 1/2001 | Piechowiak et al. |
| 6,203,010 | B1 | 3/2001 | Jorasch et al. |
| 6,206,374 | B1 | 3/2001 | Jones |
| 6,206,782 | B1 | 3/2001 | Walker et al. |
| 6,210,275 | B1 | 4/2001 | Olsen |
| 6,210,277 | B1 | 4/2001 | Stefan |
| 6,217,448 | B1 | 4/2001 | Olsen |
| 6,220,593 | B1 | 4/2001 | Pierce et al. |
| 6,224,482 | B1 | 5/2001 | Bennett et al. |
| 6,224,484 | B1 | 5/2001 | Okuda et al. |
| 6,231,445 | B1 | 5/2001 | Acres |
| 6,254,483 | B1 | 7/2001 | Acres |
| 6,312,332 | B1 | 11/2001 | Walker et al. |
| 6,315,660 | B1 | 11/2001 | DeMar et al. |
| 6,319,125 | B1 | 11/2001 | Acres |
| 6,319,127 | B1 | 11/2001 | Walker et al. |
| 6,336,859 | B2 | 1/2002 | Jones et al. |
| 6,336,862 | B1 | 1/2002 | Byrne et al. |
| 6,345,824 | B1 | 2/2002 | Selitzky |
| 6,358,149 | B1 | 3/2002 | Schneider et al. |
| 6,361,441 | B1 | 3/2002 | Walker et al. |
| 6,364,768 | B1 | 4/2002 | Acres et al. |
| 6,375,567 | B1 | 4/2002 | Acres |
| 6,375,568 | B1 | 4/2002 | Roffman et al. |
| 6,416,408 | B2 | 7/2002 | Tracy et al. |
| 6,416,409 | B1 | 7/2002 | Jordan |
| 6,422,940 | B1 | 7/2002 | Walker et al. |
| 6,429,846 | B2 | 8/2002 | Rosenberg et al. |
| 6,431,983 | B2 | 8/2002 | Acres |
| 6,435,968 | B1 | 8/2002 | Torango |
| 6,439,995 | B1 | 8/2002 | Hughs-Baird et al. |
| 6,482,089 | B2 | 11/2002 | DeMar et al. |
| 6,506,117 | B2 | 1/2003 | DeMar et al. |
| 6,508,707 | B2 | 1/2003 | DeMar et al. |
| 6,517,433 | B2 | 2/2003 | Loose et al. |
| 6,520,855 | B2 | 2/2003 | DeMar et al. |
| 6,589,115 | B2 | 7/2003 | Walker et al. |
| 6,592,460 | B2 | 7/2003 | Torango |
| 6,599,186 | B1 | 7/2003 | Walker et al. |

| | | | |
|---|---|---|---|
| 6,599,188 | B2 | 7/2003 | Hirsch et al. |
| 6,599,193 | B2 | 7/2003 | Baerlocher et al. |
| 6,609,973 | B1 | 8/2003 | Weiss |
| 6,648,753 | B1 | 11/2003 | Tracy et al. |
| 6,648,762 | B2 | 11/2003 | Walker et al. |
| 6,692,354 | B2 | 2/2004 | Tracy et al. |
| 6,712,695 | B2 | 3/2004 | Mothwurf et al. |
| 6,712,699 | B2 | 3/2004 | Walker et al. |
| 6,733,390 | B2 | 5/2004 | Walker et al. |
| 6,790,141 | B2 | 9/2004 | Muir et al. |
| 6,837,793 | B2 | 1/2005 | McClintic |
| 6,887,159 | B2 | 5/2005 | Leen et al. |
| 7,148,875 | B2 | 12/2006 | Rosenberg et al. |
| 7,166,029 | B2 | 1/2007 | Enzminger |
| 7,654,899 | B2 * | 2/2010 | Durham et al. ................. 463/30 |
| 2001/0026266 | A1 | 10/2001 | Schena et al. |
| 2002/0138594 | A1 | 9/2002 | Rowe |
| 2002/0151345 | A1 | 10/2002 | Byrne |
| 2002/0155874 | A1 | 10/2002 | Byrne |
| 2003/0027618 | A1 | 2/2003 | Byrne |
| 2003/0036430 | A1 | 2/2003 | Cannon |
| 2003/0038776 | A1 | 2/2003 | Rosenberg et al. |
| 2003/0045337 | A1 | 3/2003 | Byrne |
| 2003/0047874 | A1 | 3/2003 | Leen et al. |
| 2003/0050106 | A1 | 3/2003 | Lyfoung |
| 2003/0064776 | A1 | 4/2003 | Byrne |
| 2003/0064807 | A1 | 4/2003 | Walker et al. |
| 2003/0114218 | A1 | 6/2003 | McClintic |
| 2003/0119576 | A1 | 6/2003 | McClintic et al. |
| 2003/0148808 | A1 | 8/2003 | Price |
| 2003/0181231 | A1 | 9/2003 | Vancura et al. |
| 2003/0186733 | A1 | 10/2003 | Wolf et al. |
| 2003/0216166 | A1 | 11/2003 | Baerlocher et al. |
| 2003/0222402 | A1 | 12/2003 | Olive |
| 2003/0224852 | A1 | 12/2003 | Walker |
| 2003/0228899 | A1 | 12/2003 | Evans |
| 2003/0236116 | A1 | 12/2003 | Marks et al. |
| 2004/0009808 | A1 | 1/2004 | Gauselmann |
| 2004/0009811 | A1 | 1/2004 | Torango |
| 2004/0038741 | A1 | 2/2004 | Gauselmann |
| 2004/0048644 | A1 | 3/2004 | Gerrard et al. |
| 2004/0087368 | A1 | 5/2004 | Gauselmann |
| 2004/0106448 | A1 | 6/2004 | Gauselmann |
| 2004/0132524 | A1 | 7/2004 | Ramstad et al. |
| 2004/0166930 | A1 | 8/2004 | Beaulieu et al. |
| 2004/0204226 | A1 | 10/2004 | Foster et al. |
| 2004/0204235 | A1 | 10/2004 | Walker et al. |
| 2004/0235552 | A1 | 11/2004 | Gauselmann |
| 2004/0242297 | A1 | 12/2004 | Walker et al. |
| 2004/0242303 | A1 | 12/2004 | Walker et al. |
| 2005/0014554 | A1 | 1/2005 | Walker et al. |
| 2005/0026674 | A1 | 2/2005 | Wolf et al. |
| 2005/0032568 | A1 | 2/2005 | Griswold et al. |
| 2005/0140088 | A1 | 6/2005 | Randall |
| 2005/0148382 | A1 | 7/2005 | Fox |
| 2005/0187008 | A1 | 8/2005 | Nakajima |
| 2005/0192073 | A1 | 9/2005 | Nakajima |
| 2005/0192091 | A1 | 9/2005 | Siewert et al. |
| 2005/0282628 | A1 | 12/2005 | Beatty et al. |
| 2006/0014580 | A1 | 1/2006 | Hawthorn |
| 2006/0109256 | A1 | 5/2006 | Grant et al. |
| 2006/0119586 | A1 | 6/2006 | Grant et al. |
| 2006/0119589 | A1 | 6/2006 | Rosenberg et al. |
| 2006/0135248 | A1 | 6/2006 | Anderson et al. |
| 2006/0157632 | A1 | 7/2006 | Delson |
| 2006/0187215 | A1 | 8/2006 | Rosenberg et al. |
| 2006/0256075 | A1 | 11/2006 | Anastas et al. |
| 2006/0281530 | A1 | 12/2006 | Seelig et al. |
| 2006/0290662 | A1 | 12/2006 | Houston et al. |
| 2007/0004510 | A1 | 1/2007 | Underdahl et al. |
| 2007/0013677 | A1 | 1/2007 | Rosenberg et al. |
| 2007/0040815 | A1 | 2/2007 | Rosenberg et al. |
| 2009/0075721 | A1 * | 3/2009 | Pacey et al. ..................... 463/20 |
| 2009/0312095 | A1 * | 12/2009 | Durham et al. ................. 463/30 |
| 2010/0130280 | A1 * | 5/2010 | Arezina et al. .................. 463/20 |
| 2010/0197378 | A1 * | 8/2010 | Thomas .......................... 463/20 |

FOREIGN PATENT DOCUMENTS

| | | |
|---|---|---|
| DE | 19515983 | 4/2003 |
| EP | 0521599 | 1/1993 |
| GB | 2153572 | 8/1985 |
| GB | 2181589 | 4/1987 |
| GB | 2242300 | 9/1991 |
| GB | 2313792 | 12/1997 |
| GB | 2333880 | 8/1999 |
| WO | WO-9903078 | 1/1999 |
| WO | WO-9919037 | 4/1999 |
| WO | WO-0133478 | 5/2001 |
| WO | WO-03026754 | 4/2003 |
| WO | WO-03083789 | 10/2003 |
| WO | WO 2007/003928 | 1/2007 |

OTHER PUBLICATIONS

International Search Report corresponding to co-pending International Patent Application Serial No. PCT/US2008/005910, European Patent Office; dated Sep. 5, 2008; 2 pages.

“Big Games Safari”, IGT, 24 pages (2000).

“Easy Riches” by Sigma Game, Strictly Slots, 1 page (Aug. 2001).

“Millioniser” by Glenn Haussman, Strictly Slots, pp. 50-53 (Mar. 2004).

“New ’97 Games”, International Gaming & Wagering Business, 24 pages (Mar. 1997).

* cited by examiner

WAGERING GAME

CROSS REFERENCE TO RELATED APPLICATIONS

This application is a U.S. national stage filing of International Application No. PCT/US2008/005910, filed May 7, 2008, which is related to and claims priority from U.S. Provisional Application No. 60/930,080, filed May 14, 2007, and further claims priority from U.S. Provisional Application No. 61/002,703, filed Nov. 9, 2007 which are both incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to wagering games employing bonus games.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one aspect of the present concepts, a wagering game system for conducting a wagering game includes a display device configured to display images associated with a wagering game on a surface, the surface including a floor, a wall, a ceiling, a stage, and/or a projection screen. The wagering game system also includes at least one sensing device disposed to detect a player's input to a wagering game. The player's input includes a player's movement relative to the surface, the sensing device(s) being configured to output from an associated communication device a signal corresponding to the player's input. The wagering game system also includes a controller configured to communicate with the sensing device and the display device, the controller being programmed to cause the display device to display on the surface images associated with the player's input responsive to the signal output from the sensing device.

According to another aspect of the present concepts, a method of conducting a community-based wagering game event comprising the acts of displaying images associated with a community-based wagering game on a surface, sensing a player's movement using a sensing device, the player's movement comprising a game input, and outputting to a controller a signal bearing data relating to the player's movement. The method also includes the acts of determining, using the controller, a relation between the player's movement and the displayed images on the surface and adapting the displayed images responsive to the player's movement.

According to another aspect of the present concepts, a method of conducting a wagering game includes the acts of conducting a wagering game at a gaming machine, qualifying a player to play a bonus game separate from the gaming machine, and conducting the bonus game. The act of conducting of the bonus game itself includes the acts of displaying images associated with a wagering game on a surface, sensing a player's game input using a remote sensing device, and outputting to a controller a signal bearing data relating to the player's game input. The data comprises location data identifying a location of the player's game input relative to the surface. The method also includes the acts of using a controller to determine a relation between the location data relating to the player's game input and the displayed images on the surface and adapting the displayed images responsive to the player's game input.

According to yet other aspects of the present concepts, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
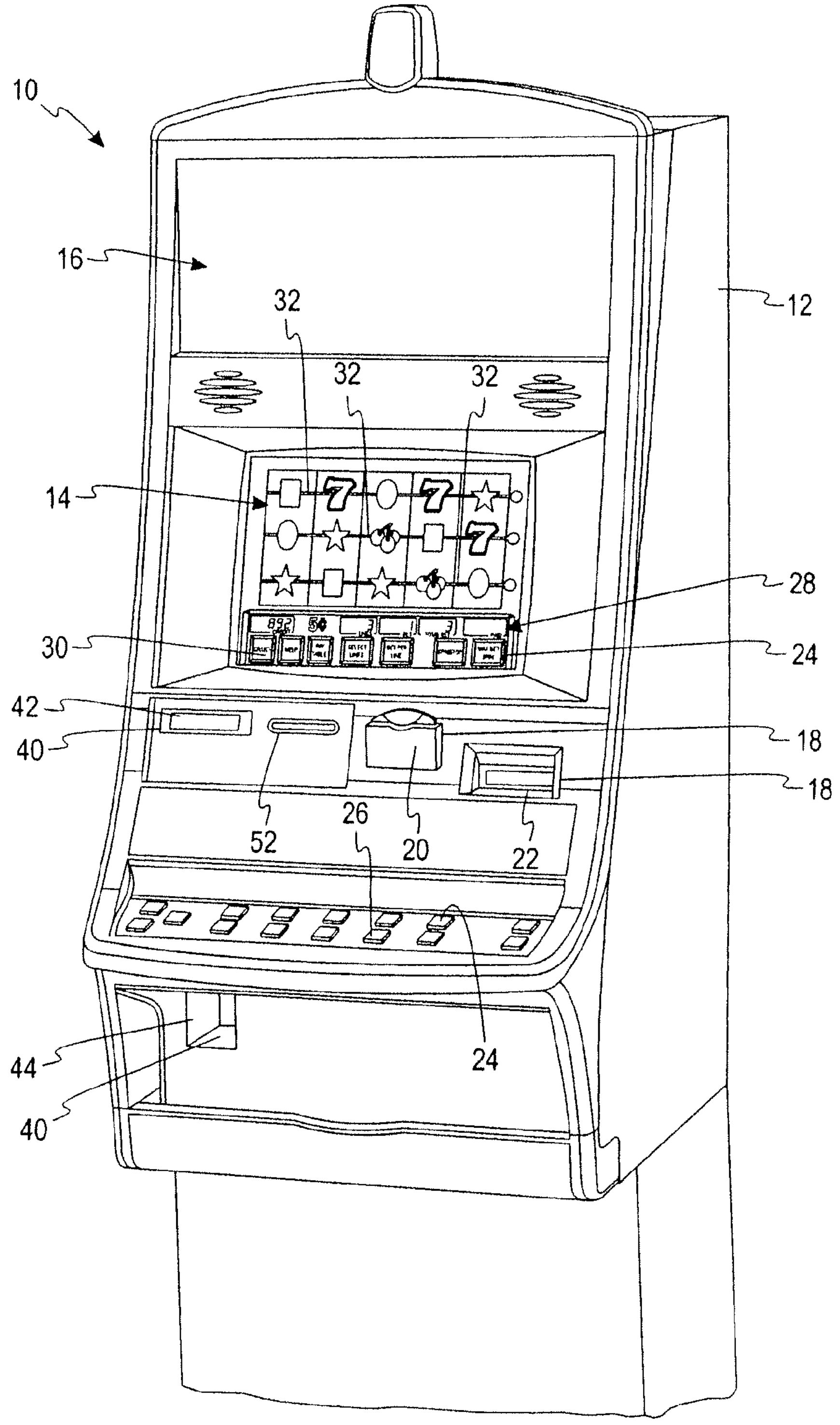
FIG. 1*a* is a perspective view of a free-standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
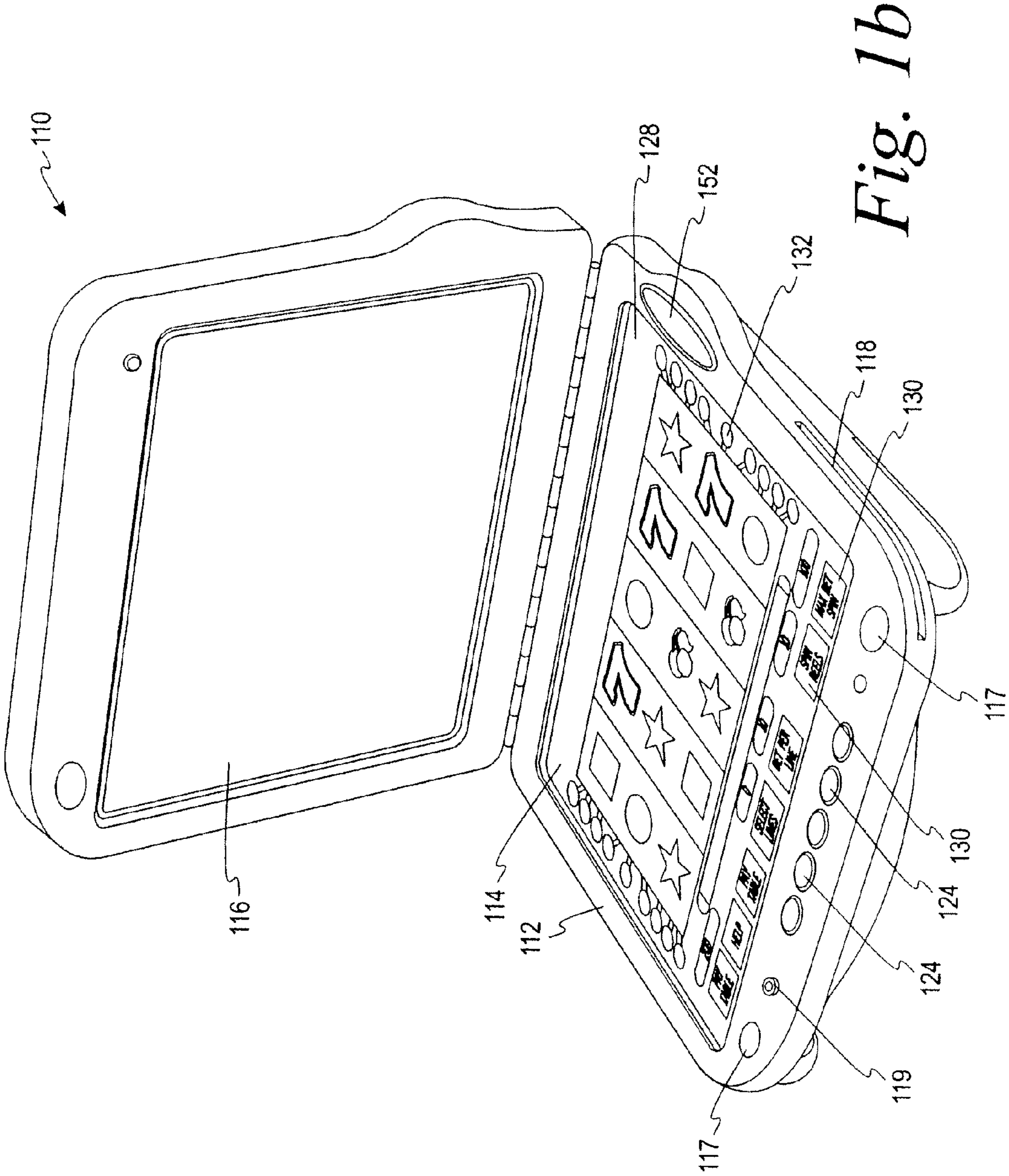
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
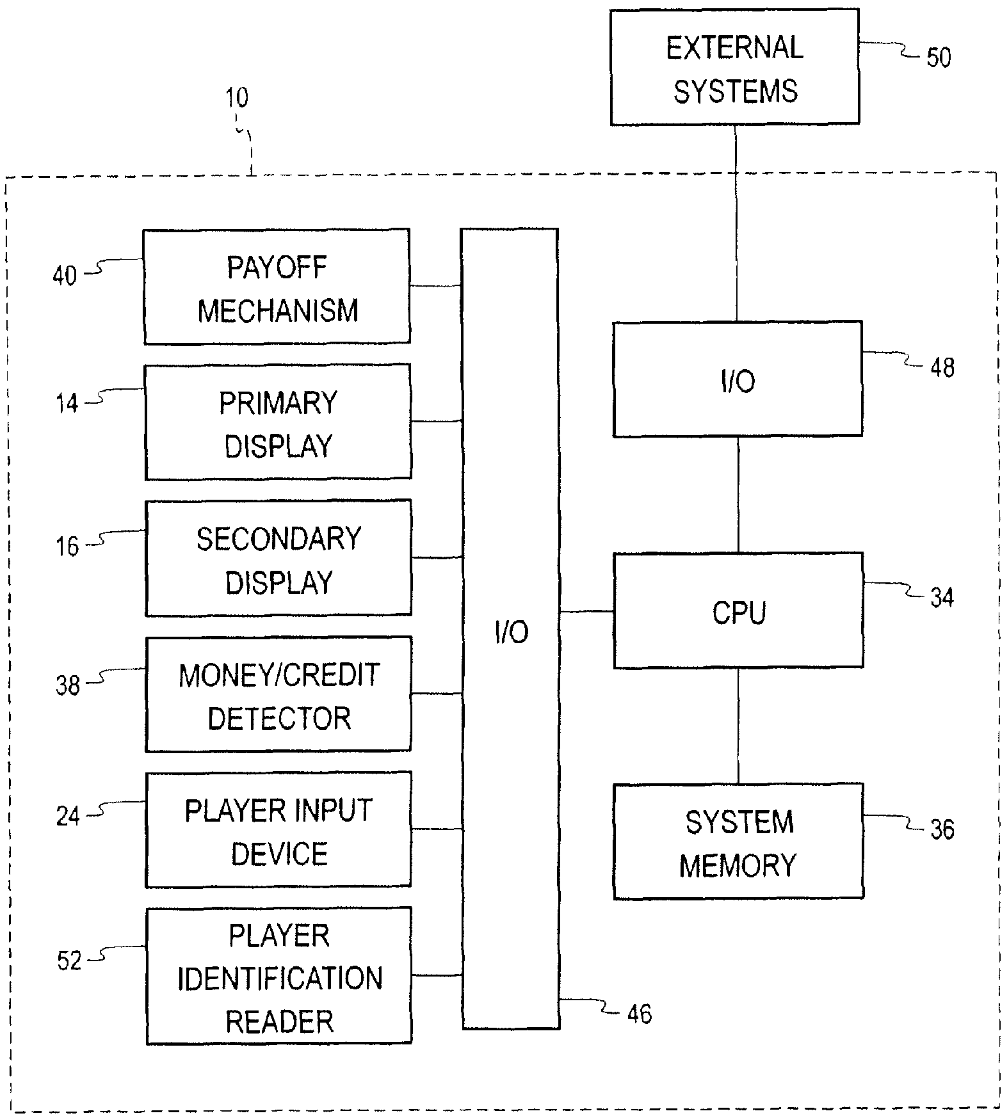
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, RF, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications.

It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, ESTABLISHING WIRELESS ROBUST SECURITY NETWORKS: A GUIDE TO IEEE 802.11, and SP 800-48, WIRELESS NETWORK SECURITY: 802.11, BLUETOOTH AND HANDHELD DEVICES, both of which are incorporated herein by reference in their entirety.

The present concepts relate generally to new forms for interaction between a player or players and the wagering gaming system. Specifically, the disclosed concepts permit a player, in real-time or at least without a significantly perceptible delay, to interact with images displayed on a surface by utilizing one or more sensors to determine, singly or in any combination, a position, movement, velocity, and/or acceleration, of a player, a player's body part, or a device or devices borne by the player. The determined information is then directly or indirectly (e.g., following processing) registered as a player's input in a wagering game or associated game. The disclosed concepts lend themselves, for example, to community-based gaming, wherein the displayed images are presented over a large area so that players may individually or collectively (e.g., teams or groups) interact with the displayed images. In accord with the concepts disclosed herein, it is possible to expand players' experiences beyond the boundaries of individual slot machines and multi-game banks. In certain aspects of embodiments of the present concepts, wherein the displayed images are projected onto a surface (e.g., a wall, floor, or screen disposed thereon) or presented within such surface (e.g., one or more displays embedded in a wall or floor to provide a large surface area display or displays), players will be partially or wholly immersed in larger-than-life base games and/or associated games, such as bonus rounds.

Figure 3:
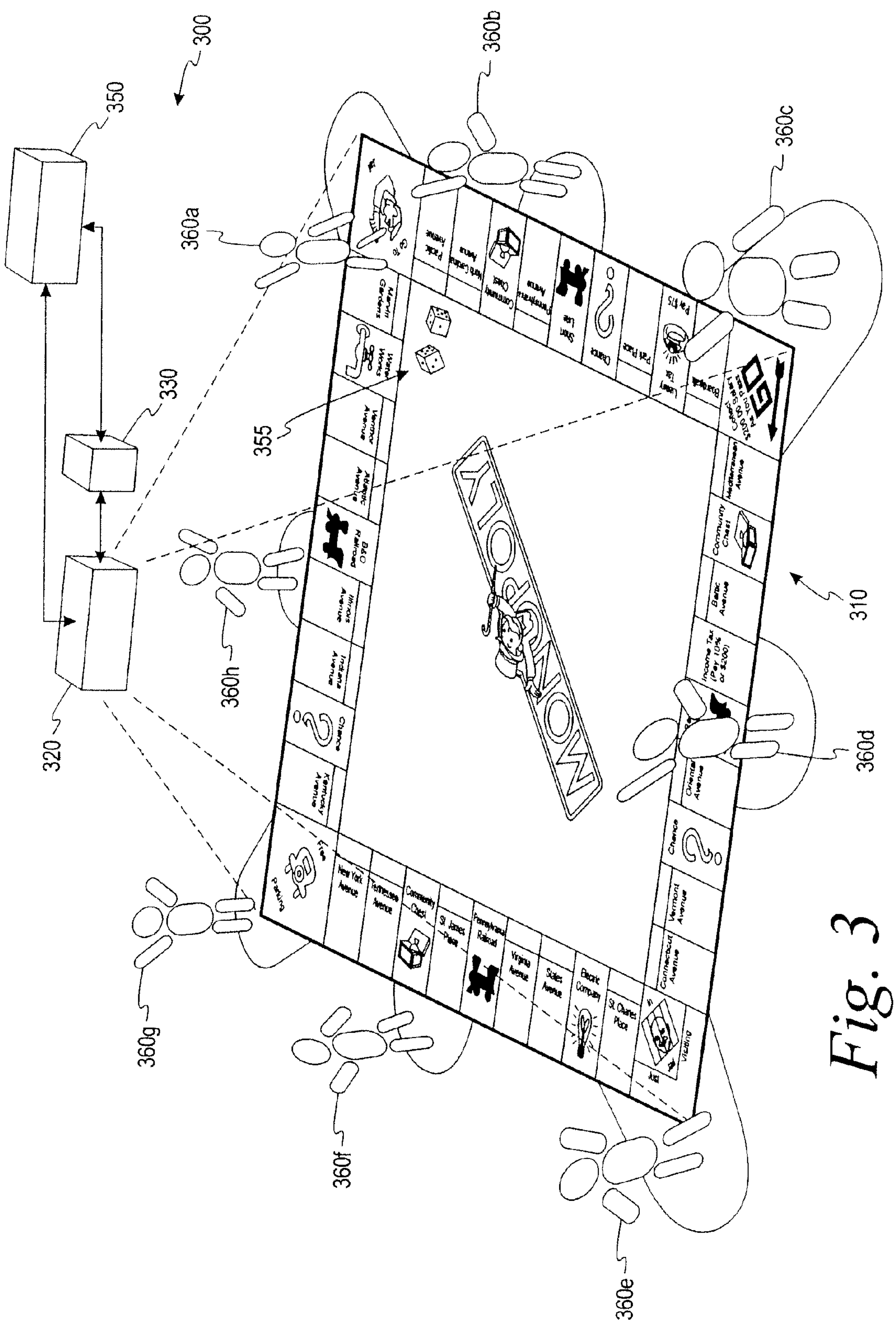
FIG. 3 is a representation of a wagering game system in accord with an embodiment of aspects of the present concepts.
Figure 4:
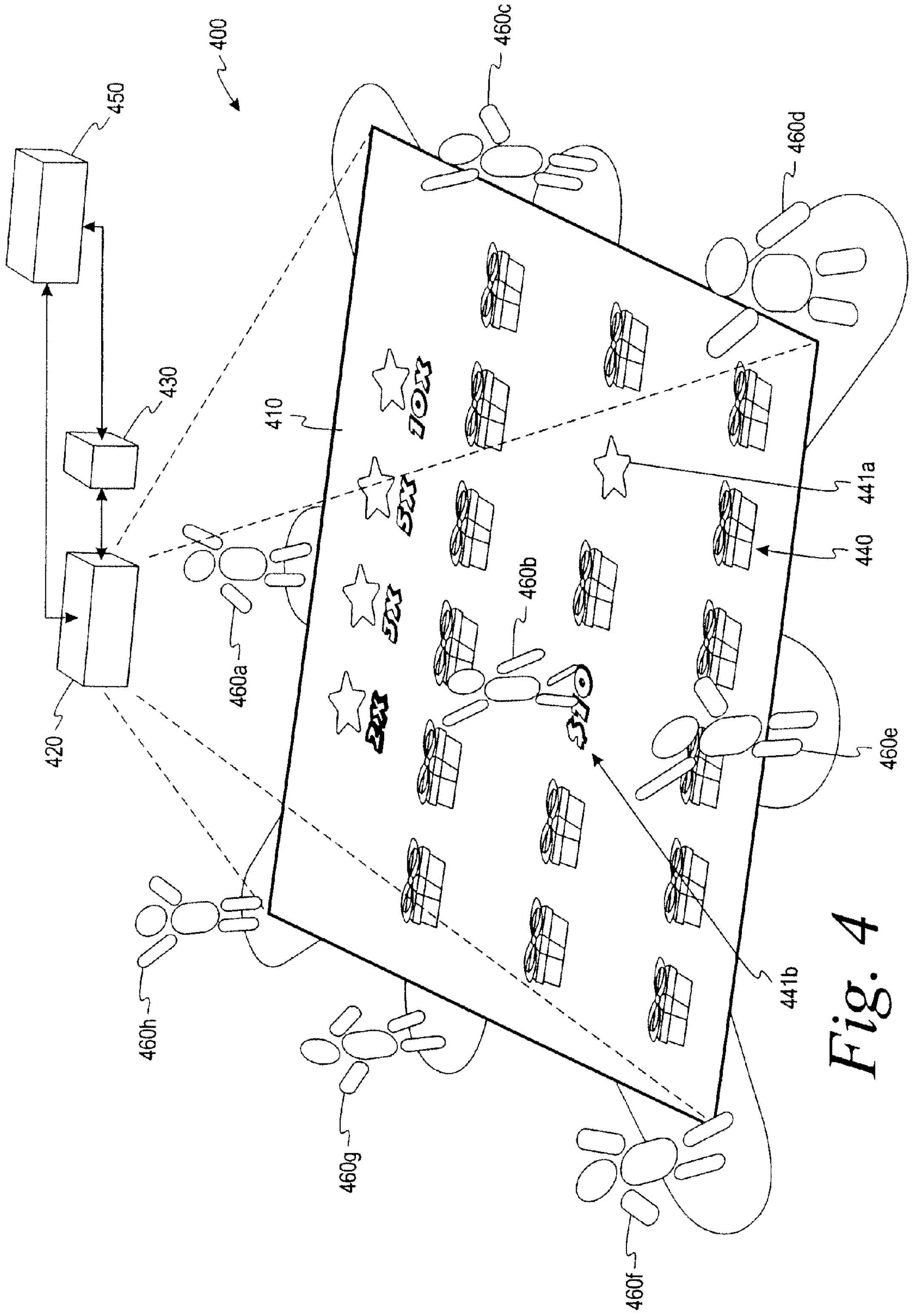
FIG. 4 is a representation of a wagering game system in accord with another embodiment of aspects of the present concepts.
Figure 5:
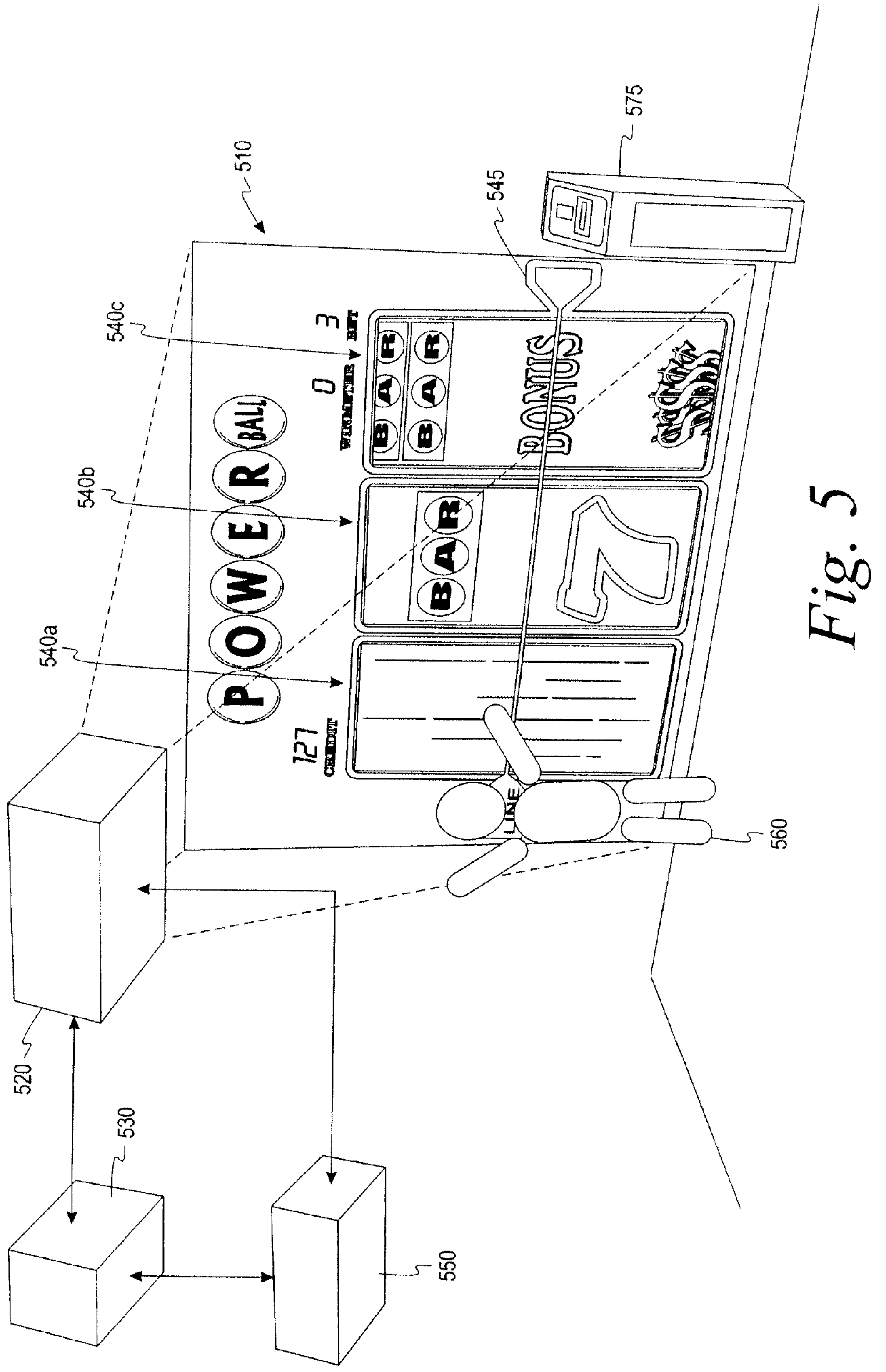
FIG. 5 is a representation of a wagering game system in accord with yet another embodiment of aspects of the present concepts.

FIGS. 3-5 show examples of a wagering game systems in accord with at least some aspects of the present concepts. The wagering game system 300 in FIG. 3 is shown to comprise a display device 320 configured to display images associated with a wagering game or related game onto a surface 310. One or more sensing devices 330 are disposed to detect a player's input to the wagering game and, in combination with controller 350, adapt the wagering game to respond to the player's input(s). It is presently preferred, but not necessary, to provide such adaptation of the wagering game system 300 responsive to the player's input(s) in real time or with substantially imperceptible delays. The sensing device(s) 330 may be disposed locally, in the vicinity of the surface 310, or remotely, depending on the particular characteristics of the sensing device(s), as can be appreciated from the description which follows. The sensing device(s) 330 are optionally integrated with the display device(s) 320 and/or controller 350 and/or signaling device (e.g., I/O port with communication device). In this example, the combination of display device 320, sensing device 330, and controller 350 may comprise the "poolSystem" technology manufactured by Arcstream AV Ltd. of London, England, which utilizes a projector and lenses adapted to the prevailing light conditions and the desired projection height and size, a sensor module for movement analysis, and a processing device running software adapted to process the movement information (e.g., "poolSoftware"). Similarly, the wagering system 300 could use the Reactrix Media Network system manufactured by Reactrix Systems, Inc. of Redwood City, Calif. Additional software, hardware, and/or firmware are also advantageously utilizable in the wagering game system 300 and/or any external systems associated with the wagering game system to provide security and controls commensurate with requirements imposed by national and local wagering regulations.

FIG. 3 particularly shows an illustrative example of the present concepts embodied in a Grand Event MONOPOLY® ONCE AROUND®. As shown in this example, eight random players 360*a*-360*h* in a gaming establishment who have made a "Grand Event Bet" on a participating gaming machine, or have otherwise qualified for the Grand Event, are invited to participate in a special bonus game, an on-site "Grand Event" to be held later the same day. The "Grand Event" is separate from any "Big Event"-style bonus the players may have experienced during regular game play, certain aspects of the "Big Event"-style bonus being described by way of example in WO2007030733, WO2007030552, and U.S. 2006287043, each of which is incorporated herein by reference in its entirety. At the designated time, the selected players (or their agent/proxy) show up at the "Grand Event" site. In the example depicted in FIG. 3, the "Grand Event" site is a floor space 310 onto which a giant MONOPOLY® board has been projected from an overhead device, described by way of example below. During game play, each of the players 360*a*-360*h* stands at or on a designated place (e.g., on a colored tile, adjacent a distinctive marker or token, etc.) at the edge of the MONOPOLY® board. One at a time, the players roll (e.g., via kicking) a set of virtual dice 355 to determine how many spaces their icon will advance from the "Go" position. In at least some aspects of this example, the game may resemble or incorporate elements from the MONOPOLY® ONCE AROUND® game, aspects of which are shown in U.S. Pat. Nos. 6,315,660, 6,482,089, 6,506,117, and 6,508,707, which are assigned to the present assignee and which are incorporated by reference in their entirety herein. For example, players can earn special prizes for landing on either "Community Chest" or "Chance" such as, but not limited to, multipliers, bonus cash awards, or a "Twice Around" game for all players. After all players have had their turn(s), they will be presented with voucher tickets containing their winnings, which may be exchanged for such winnings at a cashier station, kiosk, or the like.

Turning again to the particulars of the wagering game system 300 depicted in FIG. 3, the surface 310 upon which images associated with the game may be presented or transmitted may comprise any fixed or movable surface disposed at any angle(s) relative to the horizontal. For example, the surface 310 may comprise a wall, a floor, a ceiling, a stage, a columnar support, or a projection screen upon which the displayed images are presented to a player. Where the display device 320 is a projection-type device, substrates such as the wall or floor are preferably, but not necessarily, somewhat reflective to enhance contrast and minimize the required luminous flux of the projection-type device. Where the display device 320 is a non-projection-type device, such as an LCD, plasma display, CRT, or the like, the display device may be advantageously disposed behind a transmissive protective substrate. Thus, where the display device 320 comprises an array of or an arrangement of (e.g., a path) LCDs in a floor, the LCDs could be embedded within the floor with a transmissive protective substrate disposed thereover to protect the LCDs from the player's movements thereover.

The surface 310 may be multi-faceted, containing a plurality of different components arranged at different angles and/or positions relative to the other constituent parts of the surface 310. Further, the surface 310 need not be continuous. For example, the surface 310 may comprise large or small openings or holes (not shown) or protruding surfaces, objects, or devices (not shown) associated with the game play in a wagering game or game relating thereto.

In one example, the surface 310 may comprise a vertically disposed screen (or an angled screen) upon which the images associated with the wagering game or related game are projected. In this example, the surface 310 may advantageously comprise a plurality of small holes to facilitate the transmission of sound through the surface 310 (e.g., an at least substantially acoustically transparent surface) so as to permit speakers to be disposed behind the surface to enhance the level of interactivity between the player(s) and the wagering game or related game and/or to facilitate unobtrusive placement of external speakers.

The surface 310 may also comprise, for example, one or more transmissive substrate(s) or film(s). This aspect would be advantageous when an overlay of one or more optically clear substrate(s) disposed over one or more liquid crystal displays or plasma displays, or a projection device, embedded within a floor. Such optically clear substrate(s) could be supported by structures associated with the display(s) themselves (s) or could be separately supported and may optionally be set apart from the display(s) with a gap therebetween. The optically clear substrate(s) would, in such embodiments, protect the underlying displays from the static and dynamic forces generated by players standing and moving thereupon.

The surface 310 in the example depicted in FIG. 3 is a horizontal surface on which a plurality of players 360*a*-360*g* can move. The surface 310 is depicted to be at least substantially flush with the surroundings, but may be alternatively disposed on a raised platform or in a depression in the floor that is set apart from the surroundings. Such variants of the placement of surface 310 would naturally include appropriate avenues (e.g., stairs, movable platforms, etc.) for ingress and egress of the player(s) 360*a*-360*g*. The surface 310 is advantageously, but not necessarily, configured to enhance the ability of non-players to readily view the action in the games played on the wagering game system 300.

The display device 320 is a projector which projects upon the surface 310 images associated, in this example, with a community-event having a MONOPOLY™-based theme. The display device 320 is, in various aspects, attached to a ceiling (not shown) or suspended from a ceiling or other support member(s). Although not shown in FIG. 3, one or more monitors (e.g., LCD or plasma displays) may optionally be disposed around the suspended or elevated display device 320 to provide views of the action to players, onlookers or passers-by.

More generally, the present concepts expressly contemplate the incorporation of other varieties of image-based or optical sensing devices 330 into the wagering game system 300. For example, image-based sensing systems utilizing active or passive targets can be advantageously used in accord with the present concepts. Active targets may include, but are not limited to, infrared light-emitting diodes (LEDs), which are readily visible to the image-based sensing device, but are not visible to the players, thus minimizing distractions and fostering the illusion of immersion. One or more targets are placed on the player (marker-based system) or an object held by the player and one or more cameras are then used to detect and track the motion of the target(s) in 2-D or 3-D. Where three cameras are provided, the targets are triangulatable to determine the position of the target in 3-D space. However, the wagering game system and interaction of the player with the surface (e.g., 310) lends itself to the use of multiple cameras (e.g., 2, 3, 4 or 5) to minimize or prevent shadowing or blocking of the targets in combination with a simplified 2-D analysis of the target locations (e.g., in an X-Y plane).

In other aspects, image-based or optical sensing devices may include one or more video camera(s), CCD(s), and/or infrared or thermal imaging camera(s)/CCD(s) used singly or in combination. For example, a plurality of cameras can be advantageously utilized in combination to glean information that collectively assists in the determination of not only a location of a player relative to the surface (e.g., 310 in FIG. 3; 410 in FIG. 4; 510 in FIG. 5), but also a time-based relation between the player and the surface. The cameras, or other optical sensing device, may utilize one or both of visible and non-visible light and the image data obtained thereby subjected to processing using signal processing technique(s) to extract from the image data player game inputs. For example, where one or more cameras and/or camera types are used, the desired image data (e.g., movement of player or player's body part) may be extracted using various silhouetting techniques, edge detection techniques, blob extraction and detection techniques, etcetera.

In accord with the preceding, a sensing device 330 in accord with at least some aspects of embodiments of the present concepts utilizes one or both of visible and non-visible light. In various aspects, the optical sensing device(s) is/are configured to sense reflected visible light or non-visible light (e.g., infrared) off of one or more targets worn by or borne by the player, as noted above. Other configurations could be configured to sense interruptions in transmitted light. Optical or image based sensing devices 330 may also be adapted to determine a spatial relation of a player or player's body part relative to markers or patterns on the surface (e.g., 310, 410, 510, etc.) or about the surface. For example, the surface (e.g., 310, 410, 510, etc.) may comprise a high-contrast grid pattern visible to an infrared camera, but not visible to a video camera or CCD. Such a high-contrast grid pattern may comprise an embedded pattern in the surface or may comprise a pattern that is projected upon the surface by one more light sources (e.g., a light source having a mask pattern or reticle interposed between the light source and the surface).

In yet other alternative sensing devices 330, a structured light system utilizing one or more lasers and associated optics may be employed. For example, one or more lasers may be utilized to establish a grid of one or more laser beams of a selected wavelength and energy adjacent the substrate 310. As one example, a plurality of lasers may be arranged along a X-axis of a horizontal substrate 310 and a plurality of lasers may be arranged along a Y-axis of the substrate, the lasers along each axis being separated from one another by a predetermined distance (e.g., 0.5 inches, 1 inch, 1.5 inches, etc.) to achieve a desired sensitivity for the grid. At a corresponding position at an opposite side of the substrate 310 are disposed sensors arranged in a circuit to register the incident laser light and output a signal when the laser light is interrupted (or the converse). As a player interacts with the substrate, the laser beam(s) are interrupted and the location of the interruption may be established. Other laser-based systems are also contemplated as falling within the present concepts such as, but not limited to, those that utilize lasers in combination with camera or laser radar (e.g., time-of-flight system).

Similarly, the sensing devices 330 may comprise an acoustic tracking system (e.g., a time-of-flight system, a phase-coherent tracking system, etc.) configured to track the player or an object or objects borne by the player (e.g., a receiver, a transmitter disposed on the player's torso or on each of the players legs, the transmitter(s) being configured to output a continuous or pulsed high-frequency sound waves, etc.). For example, where a transmitter is carried by or worn by a player, a plurality of receivers disposed about the substrate 310 receive signals emitted from the transmitter and the relative position of the transmitter may be determined via triangulation. Similarly, the player may wear or carry a global positioning system (GPS)-type transceiver which determines its position relative to a plurality of satellites (or other land-based remote or local transmitters) and wirelessly outputs a corresponding positional signal to the controller 350 and/or external system controlling the wagering game system 300. To facilitate a player's control over their wagering game input, such as in a picking game represented by way of example in FIG. 4, the transceiver may comprise a button or other player-actuatable input device adapted to permit a player to selectively (e.g., when the player is in a desired position) transmit the coordinates of the transceiver to the controller 350 and/or external system controlling the wagering game system 300.

In accord with the present concepts, the player's input into the wagering game system 300 may comprise any type of signal originating from the player. Further to the above-noted, non-limiting examples, such signals may also or alternatively include output vocalizations (e.g., uttered command words), electro-magnetic signals (e.g., signals emitted from a signaling device activated by a player when the player is in a position which corresponds to the player's input, a player borne transceiver, transponder, a fob, etc.), thermal signals (e.g., a player's body heat detected by an infrared camera), magnetic signals (e.g., magnets in boots or slip-ons provided to a player interact with sensors in substrate 310), etcetera.

Any sensing device may be utilized in accord with the present concepts to yield from the player a wagering game input comprising, singly or in combination, a position, a directional component (e.g., direction of spin of a wheel or reel), a velocity component, and/or an acceleration component of a player, a player's body part, or a device borne by a player. Any of the above-noted sensing devices 330 may employ readily available off-the-shelf components, combinations of components, or systems. Such sensing devices permit the wagering game system 300 to determine a position of the player or relevant portion of a player's body (e.g., the player's legs) at any time and use such position(s) as an input to interactively adapt the images displayed by the display device (s) 320 in response to the player's location and movement. Moreover, the position information may be integrated over time to yield velocity information and/or acceleration information, which may also be advantageously utilized to adapt the wagering game system 300 not only to the player's position or position of a player's body part, but to the player's movements (e.g., running). Thus, the wagering game system 300 may be optionally configured to require not only a player's presence next to the virtual dice 355 to roll the dice, but to also require the player kick (near) the dice with a predetermined minimum leg velocity and/or acceleration. The movement of the virtual dice 355 (or other manipulated object) may also be advantageously related to the predetermined minimum velocity and/or acceleration. For example, the greater the intensity (e.g., velocity/acceleration) of the player's input (kick, hit, spin, etc.), the longer the duration of the manipulated objects spin or the longer the distance of the manipulated objects travel. In some aspects, the duration or distance of the manipulated object, or more generally the intensity of the player's input, would not affect the random outcome ultimately associated with such game input, although the behavior of the manipulated object would certainly give the player the impression that he or she somehow influenced the outcome. In other aspects, the intensity of the player's input may optionally influence the random outcome ultimately associated with such game input.

In accord with at least some aspects of the present concepts, such as that exemplified in FIG. 3, the player's input comprises a player's movement relative to the surface 310. The player's movement is sensed by the sensing device(s) 330. In at least some aspects, the data associated with the player's movements are pre-processed, conditioned, and/or processed by a processor or processors locally associated with sensing device(s) 330. In other aspects, such as is shown by way of example in FIG. 3, a communication device is associated with the sensing device(s) 330 and is configured to output signals corresponding to the player's input wirelessly or through a hard-wired communication pathway to an external system such as, but not limited to, a controller 350. Thus, the data associated with the player's movements are optionally pre-processed, conditioned, and/or processed by one or more local and/or remote controllers.

The controller 350, however coupled to the sensing device (s) 330 and the display device(s) 320, is programmed (i.e., configured to execute executable instructions borne by a memory) to cause the display device(s) 320 to display on the surface 310 images associated with the player's inputs responsive to the signals output from the sensing device(s) 330. Thus, as the player interacts with the surface 310, such as by movement, the wagering game system 300 responds to the player's inputs. For example, as is depicted in FIG. 3, a player **360*a* walks upon the surface 310 and kicks or walks on the virtual dice 355. The player's movement on the surface 310 is sensed by the sensing device 330 and, following any optional pre-processing or conditioning, are passed to a local or remote controller for processing, such as controller 350 shown in FIG. 3. The controller 350 then processes the data borne by the signals output from the communication device associated with the sensing device 330 to determine how exactly the player is interacting with the surface 310**.

In FIG. 3, the controller 350 utilizes the data associated with the player's movements to determine a location of the player 360*a* relative to the displayed images, relative to other players (or devices borne by the players), and/or relative to markers or reference points 333 which delineate known positions in space. In one example, an infrared camera is used to determine a player's 360*a* position relative to known coordinates of the surface 310 upon which the images are displayed or other known coordinates. Relative positions between the player 360*a* and the constituent elements of the displayed images may then be determined and the interaction between the player and wagering game or associated game effected. In another example, a video camera, charge coupled device (CCD), or other type of camera (e.g., an infrared camera) is used to determine a player's 360*a* position relative to known coordinates of the surface 310 upon which the images are displayed. The data borne by the signals output from the communication device associated with the sensing device 330 is processed (e.g., segmentation in 2-D or 3-D, feature extraction in 2-D or 3-D, etc.) by a controller (e.g., controller 350) to determine how the displayed images are to be updated responsive to the player's interactions with the surface 310 or the player's actions within the wagering game system 300.

The controller 350 then outputs signals through a hard-wired or wireless communication device or path to the display device 320, which then displays the updated images. Thus, in the example of FIG. 3, the virtual dice 355 are moved by the controller 350 responsive to a player's movements (e.g., kicking the dice, stepping on the dice, waving his or her hands over the dice, approaching within a pre-determined distance of the dice, etc.) to reveal a random outcome associated therewith. Responsive to the random outcome, a player's game token (not shown) is moved around the MONOPOLY® board a corresponding number of spaces.

In the example of FIG. 4, which depicts a "Grand Event" JACKPOT PARTY®, the updated images comprise a reveal of the random outcome associated with a selected one (or more) of the player-selectable elements 440. As with the example depicted in FIG. 3, a predetermined number of players (e.g., 2-32), here eight, are rendered eligible to participate in the "Grand Event" JACKPOT PARTY® to be held later in the day. Again, the eligibility may be determined or assigned in any manner and the present concepts are not conceptually limited to any particular eligibility determination. For example, eligibility may be conditioned on the placing of a "Grand Event Bet" on a gaming machine 10, 110, or merely upon invitation. Similar to the above, the "Grand Event" JACKPOT PARTY® is separate from whatever "Big Event"-style bonus the players may have experienced during regular game play. At the designated time, the players show up at the "Grand Event" JACKPOT PARTY® site, in this case a clear section of floor space 410 onto which a giant JACKPOT PARTY® board has been projected from an overhead device 420. Each of the eight players 460*a*-460*h* stands at or on a designated place (e.g., on a colored tile, adjacent a distinctive marker or token, etc.) at the edge of the JACKPOT PARTY® board.

Continuing with the example of FIG. 4, one at a time, the players make their way through the field of selectable elements 440 (e.g., present boxes), picking a desired selectable element or selectable elements, depending upon the rules of the game and/or eligibility of the individual player. In various aspects of games related to the JACKPOT PARTY® theme or more generally to any picking-type game, players may be permitted to pick only one selectable element 440, may be permitted to a predetermined plurality of selectable elements, or may be permitted to continue to pick any number of selectable elements until the realization of a game-ending or turn-ending outcome. As noted above, the selection is achieved by the player's interaction with the wagering game system in accord with the particular type of sensor element(s) 430 employed (e.g., position, movement, activation of an actuatable device, etc.).

The selectable elements 440 may be associated with positive outcomes (e.g., cash awards, merchandise, pooper blockers, a second chance for everyone to play JACKPOT PARTY®, a second round of JACKPOT PARTY® with awards at a higher award level than a prior level of JACKPOT PARTY®, etcetera), neutral outcomes, or negative outcomes (e.g., "poopers"/game-ending outcomes, turn-ending outcome, negative award, etc.).

In some aspects of game play, the players collectively play a single "Grand Event" JACKPOT PARTY® game. The players 460*a*-460*h* each take turns selecting one (or more) selectable elements 440 within an array or population of selectable elements 440 until each player completes the allocated number of selections or otherwise satisfies a turn-ending condition (e.g., time limit, negative outcome, etc.). If a player selects a selectable element 440 associated with a turn-ending outcome, the player's turn ends and the player returns to his or her designated station so that the next player may have his or her turn to select from the same array of selectable elements 440 (i.e., the array remains as it was left by the prior player). The array or population of selectable elements 440 may optionally include one or more "poopers," game-ending outcomes, that end the game for all of the players. In yet other aspects of game play, each player is permitted to independently play a separate "Grand Event" JACKPOT PARTY® game, even though each of the participants shares in the overall experience. Each player is permitted to continue selecting selectable elements 440 until they select a "pooper" (i.e., a game ending outcome), at which time that player's game is ended and any awards realized by the player during his or her game are associated with that player. Following the end of that player's turn, the array of selectable elements 440 is re-set for the next player's turn so that the next player is presented with a new array of selectable elements 440.

In FIG. 4, player 460*b* is shown to be standing on a revealed award 441*b* of $10. A selectable element (not shown) has also been previously selected and a star icon 441*a* has been revealed. Depending upon the game variant, the star icon 441*a* may have been selected by player 460*b* or player 460*a*. The star icon 441*a* represents, in this example, a special prize (e.g., a multiplier for subsequent selections of selectable elements). As shown, the bold star in the upper portion of the substrate 410 upon which the images are projected indicates that the star icon 441*a* is associated with a "2×" multiplier to be applied to the subsequent revealed awards for that player, for other players, and/or for all players, depending on the game variant.

After all players have had their turn(s), they are presented with voucher or ticket associated with their winnings (e.g., via bar codes and/or negotiable instrument security features and/or electronic security features using local or remote databases), a substrate bearing value (e.g., a smart card, a stored value card, etc.), or receive an electronic transmission of value (e.g., to an electronic wallet) in accord with an available redemption or award scheme and/or a player's indicated preference. Alternatively, for those players known to the gaming establishment (e.g., those having player's club cards), their winnings can be deposited directly into accounts associated with the player or designated by the player.

In accord with at least some other aspects of embodiments in accord with the present concepts, the player's input via the player's interactions with the surface or the player's actions within the wagering game system (e.g., 310, 300 respectively) can also relate to displayed elements not being associated with a random outcome. For example, as is generally represented in FIG. 5, a player may be permitted to provide an input including, but not limited to, selection of a payline 545 from a plurality of paylines (not shown). The present concepts are not limited to any particular game-related outcome or non-game-related outcome and may include any player input of any type or consequence, outcome-related or non-outcome related, or with respect to any information or query input by the player into the wagering game system.

The example of FIG. 5 depicts a "Grand Event" POWERBALL™ 3-reel game wherein the player-selectable elements comprise reels 540*a*-540*c* and one or more paylines 545. This example similarly depicts the use of the aforementioned "poolSystem" technology manufactured by Arcstream AV Ltd., with a focus on individual slot play. In at least some aspects, the "Grand Event" POWERBALL™ may be configured as a bonus event and the access thereto optionally governed by achieving eligibility on other gaming machines or by other means (e.g., buy-in, invitation, comp, etc.). Alternatively, the access to the "Grand Event" POWERBALL™ may be configured as a base wagering game with no eligibility requirements, save the input of funds to wager. In accord with the game variant, players input either their value-bearing media or their eligibility-conferring media (e.g., cash, credit or debit card, slot card, bar-coded ticket or voucher, negotiable instrument, electronic device transmitting account-related data, etc.) into a kiosk 575. The kiosk 575 is preferably, but not necessarily, disposed adjacent the side of a designated viewing substrate 510, such as a blank wall space, screen, or tabletop. Following confirmation of the player's ability to pay or eligibility to play the "Grand Event" POWERBALL™ game by the kiosk 575 and/or any associated external systems 50, the virtual 3-reel version of POWERBALL™ (or other designated or selected game) is brought to life on the viewing substrate 510. The player selects the denomination and number of lines they wish to play through selection of selectable elements associated therewith and, when ready, the player touches a reel, such as reel 540*a*, to begin play. The reels 540*a*-540*c* spin and can either be stopped by the player's touch, or by the playing out of a regular spin. Once the player has finished, he or she may push a virtual "Cash Out" button (not shown) and the kiosk 575 associates the player's winnings with the value-bearing media used by the player or the kiosk outputs a ticket, voucher, or card bearing a value corresponding to the winnings or being redeemable for the winnings.

As noted above, the player may be permitted to select a desired game to play from a plurality of available games that may be displayed on a kiosk 575 display (not shown) or that may be displayed by the display device 520 on the viewing substrate 510. Thus, for example, a player may be permitted to select between a "Grand Event" POWERBALL™ game (3 reel, 4 reel, or 5 reel), "Grand Event" REEL 'EM IN® game (3 reel, 4 reel, or 5 reel), or any other of a desired population of available games stored locally or remotely in association with the wagering game system. Following selection of the desired game, game screens associated with the selected game are displayed on (e.g., projected onto) a substrate such as an open space on the casino floor or wall.

In one aspect of the "Grand Event" REEL 'EM IN® game example, the player stands at the base of one of five displayed reels. Directly in front of the player and below the bottommost reel are individual "Spin Reels" buttons. The player steps on his/her "Spin Reels" button, optionally following a prompt, to begin the game. Once this is done, the "Spin Reels" button becomes a "Stop Reels" button and the player steps on the "Stop Reels" button at his or her discretion to stop the reels. Alternatively, the player steps on "Spin Reel" buttons and "Stop Reel" buttons corresponding to individual reels to respectively start and stop individual reels. When a bonus game is triggered, the player will be sent into the virtual depths of a fishing contest and engage in a life-sized REEL 'EM IN® bonus game. In such a bonus game, the player's movements relative to the images displayed on the substrate 510 comprise inputs to the bonus game, such movements optionally requiring contact with the substrate.

As with the 3-reel POWERBALL™ game depicted in FIG. 5, the player may elect to cash out at any point during base game play. The REEL 'EM IN® base game and/or bonus game, or any other base game and/or bonus game, may advantageously be configured for community play (e.g., competitive or cooperative) in accord with various aspects of the present concepts. For example, in the virtual REEL 'EM IN® base game, one player may be assigned to start and stop a single reel. Likewise, if the group of players triggers a REEL 'EM IN® bonus game, each of the players is provided an opportunity to participate in the bonus game, either individually or as a team, to provide an enhanced, large-scale, community gaming experience.

In accord with at least some aspects, the player's input comprises contact with the surface at a location of an image corresponding to a desired input. Thus, with respect to the example of FIG. 3, the player's input could comprise contact with the surface 310 at a location of an image (e.g., virtual dice 355) corresponding to a desired input (e.g., rolling the dice). In the example of FIG. 4, the player's input could comprise contact with the surface 410 at a location of an image (e.g., selectable element 440) corresponding to a desired input (e.g., selection of a selectable element). In the example of FIG. 5, the player's input could comprise contact with the surface 510 at a location of an image, such as a reel 540*a*, corresponding to a desired input (e.g., input to spin/stop reel). As can be appreciated, the player's input in each of these examples is merely one example of a specific type of player input and is not representative of all potential manners of such input, taken singly or in combination. For example, a contact requirement may be paired with another requirement such as a time condition to produce, in the aggregate, a player input requiring maintaining contact with the surface for a minimum time period (e.g., ½ second, 1 second, 2 seconds, etc.) to ensure that the player's contact with the surface is intended, rather than inadvertent or fleeting.

Figure 6:
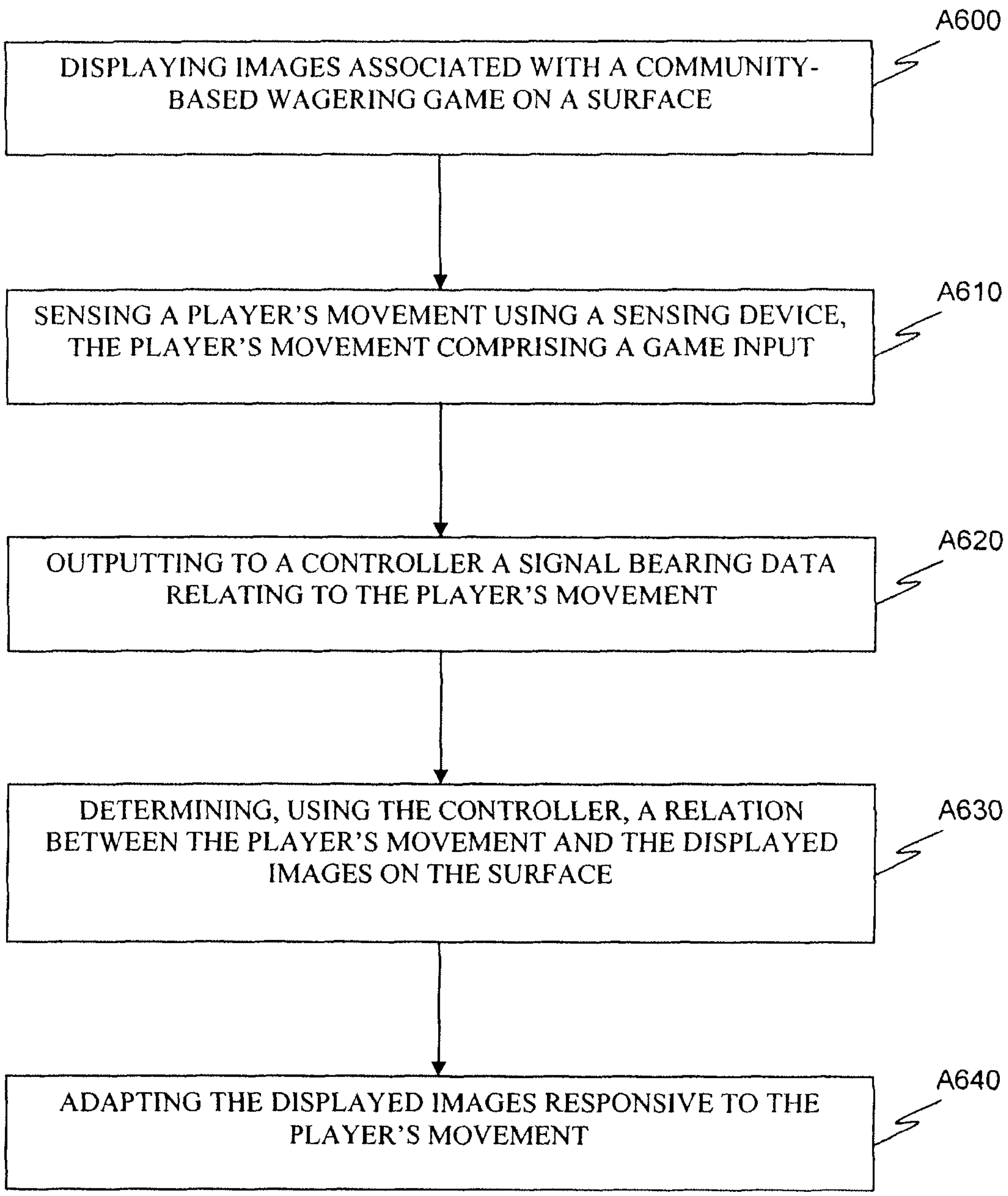
FIG. 6 is a flow chart of one method in accord with an embodiment of aspects of the present concepts.
Figure 7:
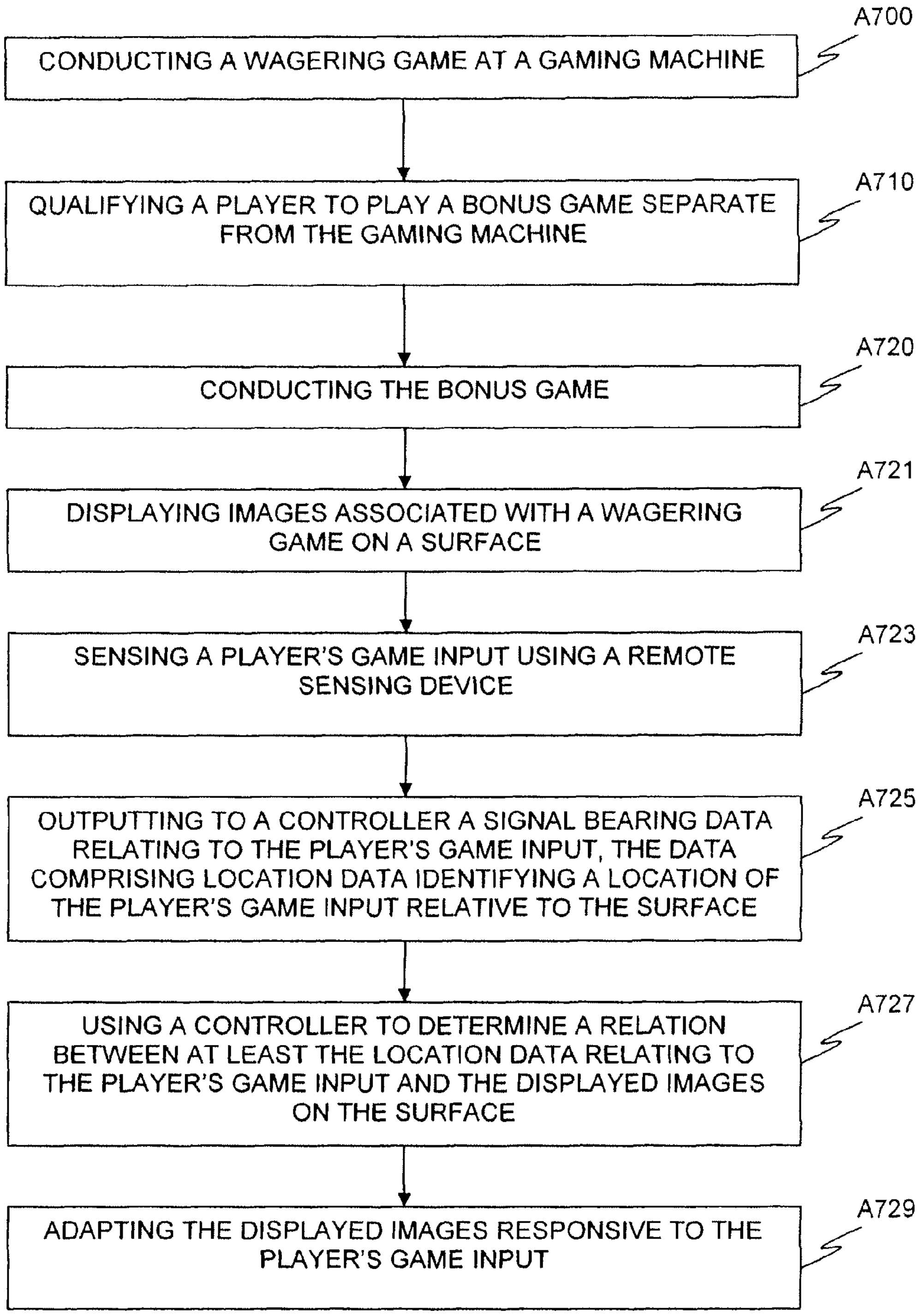
FIG. 7 is a flow chart of one method in accord with an embodiment of aspects of the present concepts.

In view of the foregoing, it can be appreciated that the present concepts include, for example, as shown in FIG. 6, a method of conducting a community-based wagering game event, the method comprising the acts of displaying images associated with a community-based wagering game on a surface (A600), sensing a player's movement using a sensing device, the player's movement comprising a game input (A610), and outputting to a controller a signal bearing data relating to the player's movement (A620). This method also includes an act A630 of determining, using a controller, a relation between the player's movement and the displayed images on the surface and an act A640 of adapting the displayed images responsive to the player's movement. The act A640 of adapting the displayed images may comprise, for example, the acts of revealing a randomly determined outcome, registering a player's input, activating an inactive element of a displayed image, and/or de-activating an active element of a displayed image. For example, the act A640 could include a selection of a selectable element, such as a present 440 in FIG. 4, or registration of a player's input, such as kicking the virtual dice 355 in FIG. 3. In still other examples, the act A640 could include a selection of a video reel to spin or to stop, such as reels 540*a*-540*c* or the selection of a pay line 545 in FIG. 5. The method, further to act A640, may also include awarding to the player an award corresponding to any randomly determined outcome.

As another example, the present concepts include a method of conducting a wagering game, the method comprising the acts of conducting a wagering game at a gaming machine (A700), qualifying a player to play a bonus game separate from the gaming machine (A710) and conducting the bonus game (A720). The act of conducting the bonus game (A720) in this example itself comprises the acts of displaying images associated with a wagering game on a surface (A721), sensing a player's game input using a remote sensing device (A723), outputting to a controller a signal bearing data relating to the player's game input (A725), the data comprising location data identifying a location of the player's game input relative to the surface, using a controller to determine a relation between at least the location data relating to the player's game input and the displayed images on the surface (A727), and adapting the displayed images responsive to the player's game input (A729). The act A729 of adapting the displayed images may comprise, for example, the acts of revealing a randomly determined outcome, registering a player's game input, activating an inactive element of a displayed image, and/or de-activating an active element of a displayed image.

In additional variants of the present concepts, each of the above examples making reference to a display device 320 or sensing device 330 in the singular is considered equally applicable to the use of one or more display devices 320 or sensing devices 330, in any combination Likewise, any mention of plural display devices 320 or sensing devices 330 is considered equally applicable to the use of one display device 320 or one sensing device 330, singly or in combination. Further, the handheld gaming machine 110 may advantageously be reduced in form to a wireless handheld gaming input device comprising one or more actuatable player-input devices (e.g., buttons, touch keys, plunger, dials, knobs, pressure sensitive devices) and/or passive player-input devices (e.g., transponder, GPS device and transmitter or transceiver, etc.) by which a player may register his or her game input.

An electronic device carried or worn by the player such as, but not limited to, a handheld gaming machine 110 or other type of wireless handheld gaming input device, may comprise one or more motion sensing devices, such as is described in WO2007022256, titled "Handheld Gaming Machines and Systems Therefor," published on Feb. 22, 2007, or U.S. Provisional Application No. 60/762,744, filed Jan. 27, 2006, titled "Handheld Device for Wagering Games," or U.S. Patent Application No. 60/818,132 filed on Jun. 30, 2006, titled "Method And Apparatus For Use Of Movement And Position Sensors With Portable Handheld Wagering Devices," which are each incorporated herein by reference in their entirety. Motion sensing devices permit a player to register not only a dimensionless game input, such as the press of a button to yield an output signal representing the pressing of the button, but to also permit the player to register game inputs comprising location, velocity, acceleration, and/or tilt within any reference frame or along any desired axis or axes, however defined.

Moreover, in any of the aspects described herein, the player wagering input may comprise a combination of an actuation of one or more actuatable player-input devices and an input from a passive player-input device. Thus, a player input may comprise, in at least some aspects, a player actuating one or more actuatable player-input devices while standing in a certain location, determined by a transponder borne by the player. As another example, the player input may require the player to stand in a certain position or area and swing the wireless handheld gaming input device to attain a predetermined minimum acceleration, optionally while performing some other input, like pressing a button.

In alternative aspects of the present concepts, a physical game object other than the player(s) (e.g., 310*a*-310*h*) may be integrated into the gaming environment (e.g., 310, 410, 510). This integration may be, in certain respects, similar to the above-noted electronic device carried or worn by the player (e.g., a handheld gaming machine 110, a wireless handheld gaming input device, etc.), wherein the wagering game system (e.g., 300) is provided with the ability to observe or monitor such physical game objects (e.g., physical dice, roulette wheel, etc.) using sensors and/or cameras, to allow the player to interact with the gaming environment through a physical device, rather than merely by a personal physical interaction between the player and the gaming environment. Although the physical object may comprise a handheld gaming machine 110 or a handheld player input device or button panel, as noted above, other embodiments of the physical object include physical game objects 800 such, but not limited to, physical dice, shown in FIGS. 8*a*-8*b*.

The physical game objects 800 may comprise one or more different sets of dice, each of the different sets of dice and/or die within each set of dice being provided with similar or distinctive markings, indicia, or characteristics that may be sensed by a sensor or viewed and analyzed by a sensing element (e.g., 440 in FIG. 4), such as a camera, to enable use of such physical game objects in different games or in different stages of a game.

In some aspects, the physical game objects 800 comprise a moveable object bearing indicia that are static relative to the base substrate, such as in the pips on a die (e.g., the pips do not move relative to the die). As two non-limiting examples, the player may be provided with enlarged, real dice to throw in the gaming environment (e.g., 310, 410, 510) or may be permitted to spin a large wheel having indicia thereon in the gaming environment. A sensing element (e.g., 440), such as a camera, may then view the pips presented on the upper surface of the dice or the indicia indicated by a pointer adjacent the wheel, an associated controller 34 may then analyze the image using standard image extraction and data analysis techniques, and determine the outcome.

Figure 8A:
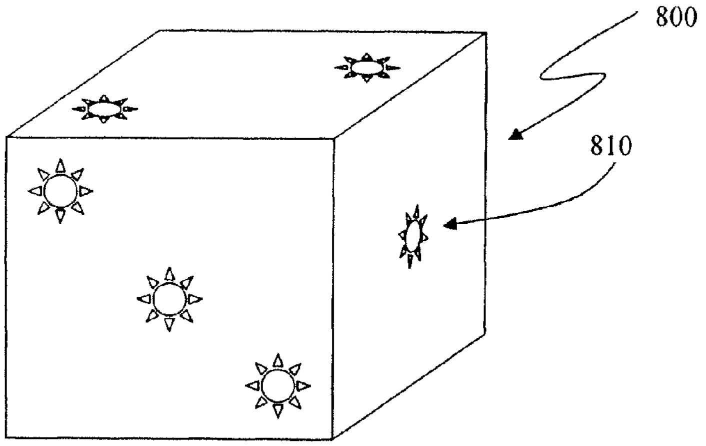
FIGS. 8*a*-8*c* are embodiments of a physical game object in accord with at least some aspects of the at least one of the present concepts.

In a slightly different arrangement, the pips on the dice could be replaced by LEDs 810, such as is represented in FIG. 8*a*, emitting either visible light visible to a standard camera or infrared light visible to an image-based infrared sensing device. A battery, preferably rechargeable (e.g., via a docking station), is housed within each die to power the LEDs. Alternatively, the die or dice may be powered through a wireless power mechanism embedded within the gaming substrate (e.g., the floor, the table) operating via inductive charging. Care would need to be taken in the design of such a die, and in the ongoing maintenance of the die, to ensure that the die is properly balanced and fair and that movement of components within the die do not compromise the fairness or randomness of each toss.

Figure 8B:
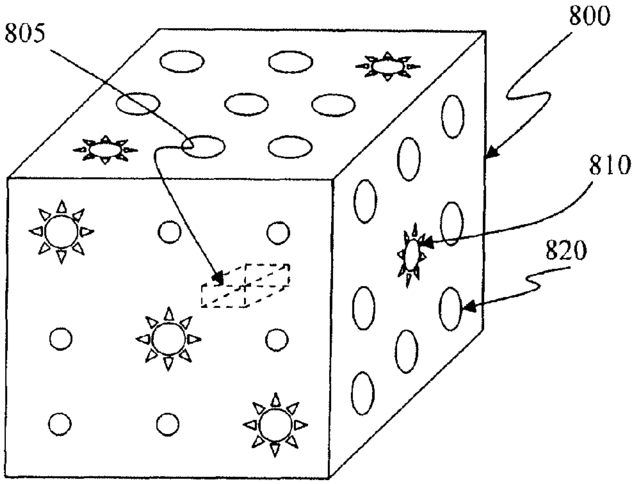

In yet another aspect, shown in FIG. 8*b*, the physical game object 800, again a die in the illustrated example, could comprise a plurality of graphical elements 810 (e.g., LEDs) in innumerable arrangements, patterns, colors or matrices, each of the graphical elements being selectively powered (e.g., on, off, pulsing, flashing, etc.) by a control system comprising an embedded controller 805 and a wireless communication device (e.g., RF, Bluetooth, etc.)(not shown). In an externally controlled system, the embedded controller 805 communicates with the aforementioned controller 34 and/or external systems 50 associated therewith to depict, on the graphical elements 810, an outcome corresponding to that called for by the game controller 34. In an internally controlled system, the embedded controller 805 may itself perform the function of a game controller and, for example, may be programmed to perform its own RNG function to display appropriate game outcomes. Whether internally or externally controlled, the physical game object may be configured such that any given face on the physical game object can depict, at any instant, any desired one of a plurality of different indicia, symbols, numbers, colors, or the like, using different combinations of LEDs. As shown in FIG. 8*b*, graphical elements 810 are illuminated, whereas graphical elements 820 are not illuminated. Thus, in at least some aspects of the physical game object concept, each face or surface of the physical game object 800 may be similarly configured so that, no matter what face or surface is presented (e.g., facing upwardly), the controller 34 and/or embedded controller causes the graphical elements 810, such as LEDs, on the presented face to display any randomly selected outcome from a plurality of potential random outcomes. For example, the presented face of the physical game object 800 in FIG. 8*b* shows two illuminated graphical elements 810, the outcome, with seven dark or non-illuminated graphical elements, which do not form part of the outcome.

For an internally controlled system utilizing an embedded controller, the outcome of the physical game object 800 may be sensed using use of sensing elements (e.g., 440), such as cameras. In addition or alternatively, the embedded controller 805 that functions as the RNG outputs the outcome to a controller 34 and/or external system 50 using a wireless communication device.

Figure 8C:
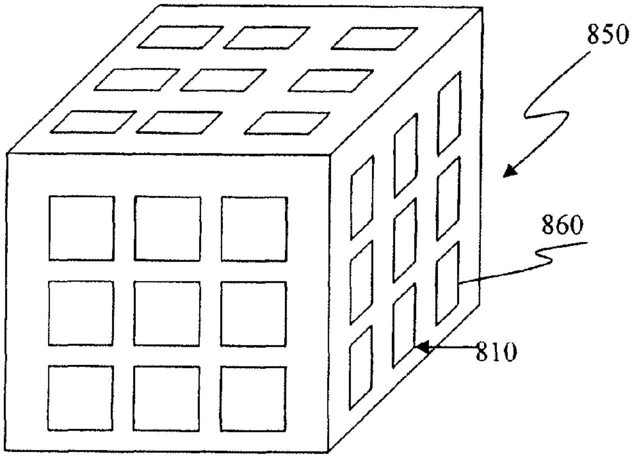

In still other aspects, such as is shown by way of example in FIG. 8*c*, one or more faces of the physical game object 800 may comprise graphical elements 810 including one or more displays 860 to form a graphically augmentable physical gaming object. The display(s) 860 may comprise an OLED display, AMOLED (active-matrix OLED), an electroluminescent display (ELD), an e-paper display, passive or active LCD, thin-film transistor LCD (TFT LCD), or the like, that can be controlled either internally by an embedded controller 805 or remotely by controller 34 through a wireless communication path. As shown in FIG. 8*c*, a plurality of faces of the physical game object 800 comprise a plurality of small black and white or color displays 860 that may be densely packed or distributed (e.g., a plurality of 1"×1", 2"×2", or larger etc. displays). Alternatively, only one face or surface of the physical game object 800 may comprise a plurality of displays. Additionally, one or more faces or surface of the physical game object 800 may comprise a single display. Such displays, particularly the OLED display and LCDs, may display complex animations to indicate any one of a variety of awards, anticipatory game predictors, outcomes, or game states.

In various wagering game contexts, the graphical elements may variably display special faces, different from the typical one-through-six numbers or pips, and may display multipliers, numbers of spaces to be moved on a game board, numbers in excess of the number of sides on the die, or portions of winning phrases, symbols, or puzzle pieces that, when combined with the other portions of phrases, symbols, or puzzle pieces presented on another or dice, create a bonus outcome for the player.

In a "Grand Event" game such as the JACKPOT PARTY®, depicted by way of example in FIG. 4, a player could roll a die or a plurality of dice (e.g., a pair of dice) across the field of selectable elements 440 (i.e., presents as shown) and the selectable elements touched by the physical die or dice thrown by a player would award a revealed credit amount or other randomly determined outcome. As disclosed herein, the location of each die may be tracked by sensor element(s) 430 and the spatial relation between each die and a corresponding one of the selectable elements 440 determined to provide an appropriate correspondence between an award value revealed by a selectable element and a multiplier revealed by a die.

In accord with some aspects of bonus game play, the outcome presented by the particular die could act as a multiplier for the credit award of the selectable element(s) 440 revealed by the die. Additionally, a selectable element 440 may reveal a neutral outcome, such as a die or dice icon, which would permit another roll, but not an award, or the die (i.e., physical game object 800) itself may reveal a die or dice icon which would provide another turn instead of a multiplier. The physical game object 800 graphical element 810 may also be configured to display a random outcome of a "Pooper Blocker" that protects the player from any selection of or reveal of a "Pooper" on a subsequent pick.

Such physical game objects 800, such as the die or dice depicted in FIGS. 8*a*-8*c* may also find applications in other community event bonus games, such as a Monopoly®-themed "Grand Event" game. In such as embodiment, a die could be configured to display conventional numbers or pips representing a number of spaces that a token is to advance on a giant Monopoly® game board. Alternatively, in lieu of the physical game object 800 graphical elements 810, such as an OLED display, showing numbers or pips, the graphical elements could actually show property station cards and credit values, such as PARK PLACE or BOARD WALK, and the player would be awarded the amount indicated as corresponding to that property. Additional faces of the physical game object could include other potential outcomes, such as a "FREE" on one physical game object and "PARKING" on another physical game object, which, if rolled, awards a substantial credit prize.

If the prizes awarded in a "Grand Event" game, however themed, are based on a progressive meter or progressive pool of some kind, a need may exist for dynamically varying the outcomes achievable by the die or dice to ensure that whatever awards might be indicated by the physical game object(s) 800 do not exceed the maximum payout. In one example, different sets of dice may be used, with one set of dice having have a maximum roll of ten times a credit amount, while another pair of dice might only have a maximum payout of five times. The dice to be used will be determined after the players have been selected to participate, but before the game begins, so that the master of ceremonies can use the correct set. Alternatively, only one die or one set of dice is required and the dice are periodically updated (e.g., every 25 milliseconds, every second, every minute, every hour, etc.) by controller 34 to reflect a current state of the progressive meter(s) or pool(s) to reflect appropriate potential award amounts. For example, the player may even be provided with one physical game object 800, comprising a die, for each digit in the progressive award, or perhaps only the most significant two or three of the digits, wherein the dice are periodically updated. When the player rolls the dice, he or she gets exactly the progressive prize shown by the dice.

Preferably, but not necessarily, any graphical element 810, such as a display, would be floating or shock-insulated. For example, the graphical element(s) 810 may be advantageously slightly recessed, resiliently suspended from a skeleton or within surfaces of the physical game object 800, peripherally encased with a shock absorbing material, and/or covered with a protective transparent film or window to minimize the potential for damage to the graphical elements caused by repeated use. To facilitate the longevity of the physical game object 800, the surface (e.g., 310) of the gaming environment upon which the physical game object(s) 800 are thrown could alternatively be or could also be configured with impact absorbing material (e.g., foam) to cushion the impact of the physical game object thereon.

In still another embodiment, the faces or surfaces of the physical game object(s) 800 may themselves be blank and form individual backdrops or screens against which the overhead device 420 or other projection device may project the randomly determined outcome for the throw.

Continuing with the example of physical game objects 800 that comprise dice, the starting state and intermediary states of the die faces may assume any desired state. For example, when the game starts the faces of the dice may display a temporarily fixed base or first set of symbols. A player (e.g., 360*a*) of a Grand Event game rolls the dice to reveal a first outcome associated with the first set of symbols. The symbols on the same dice may then change to reflect a second set of symbols, which may include an entirely new set of symbols or which may include one or more of the symbols from the first set of symbols. This variance, the modification of symbol sets as the game progresses over two or more throws of the dice, provide the player with a sense of the progression during game play and heighten excitement as the symbols change to reflect, for example, more favorable symbols, indicia, and/or multipliers. In the preceding example, the faces of the dice remain static from the beginning of the throw until after the end of the throw and change at some point prior to the next throw.

Since the appearance of the dice surface(s) can be changed dynamically the function of the dice can be changed with time, changed responsive to the number of throws, and/or changed responsive to the state of the game. For example, the dice may normally display a number of pips that indicate a value of one through six. In a bonus mode, however, one or more of the dice faces changes to display a bonus symbol, triggering symbol, or multiplier. Also or alternatively, the color of the face may change or the type or number of symbols may change. As one example, a die face initially showing a white background with two pips might change to a green background with a black “$” to indicate that that face of the die is now wild.

In another example of a different possible starting state and intermediary state, a player may initially be prompted to throw a “dark” or unlit die or dice. As die or dice hit the ground (e.g., surface 310) and start to roll, the lights (e.g., LEDs) or displays begin to activate. Alternatively, the die or dice are handed to the player in an active, lit state wherein the patterns of LEDs or images displayed on the displays may be shifting, constantly changing until after the die or dice are thrown and assume a resting state, with the final shift in the displayed pattern of LEDs or displayed image(s) on the display reflecting the dictated randomly determined outcome.

Using the example of the wagering game system 400 in FIG. 4, for example, a player could roll dice to pick presents in the array. One six-faced die may be used to display a randomly selected one of the depicted selectable elements 440 and another six-faced die may display a potential multiplier.

In any of the aforementioned die or dice embodiments, the impacts and rotational motion of the physical game object 800, such as rolling or tumbling die or dice, may be sensed by accelerometers or sensors such as, but not limited to, Inertia-Link®, 3DM®, or 3DM-DH® sensor suites, produced by MicroStrain® of Williston, Vt., built into the physical game object. When the presented face is known, the randomly determined outcome called for by the embedded controller or the game controller 34 can then be readily displayed on the presented face or die or faces of the dice. The orientation of the die or dice in space may alternatively be ascertained by the embedded controller using, for example, mercury switches, inclinometers, or the like. In still other aspects, the orientation of the die or dice can be determined by embedding sensors and/or targets (e.g., IR targets) in each of the faces of the die or dice that, when exposed in the gaming environment, permit the rapid ascertaining of the presented die face or dice faces in combination with corresponding emitters and/or sensors disposed within the gaming environment.

The gaming environment is not limited to any of the above-noted gaming environments and may comprise instead a conventional table-top styled gaming environment such as, but not limited to, a giant virtual craps table, chuck-a-luck (grand hazard, sic bo), or the like, any wagering game embodying a board game, or any wagering game embodying dice as a vehicle for conveying to the player the randomly determined outcome.

Consistent with the above example, various aspects of the present concepts provide physical game objects that can actually change their appearance at any time before, during, or after game, such as by altering the graphics, symbols or numbers displayed by or projected onto the physical game objects. Further, the physical game objects provide a suitable vehicle for advertisements by the gaming establishment. Such advertisements could be presented while the physical game object(s) is or are in a wait state during non-use, or may be presented briefly just prior to the reveal. To generate positive association between the player and the advertiser, the advertisement may be selectively configured to only appear just prior to a reveal of a beneficial outcome such as, but not limited to, a particular trigger, award, or multiplier.

The present concepts may be extended to other forms of physical game objects 800 advantageously, but not necessarily, utilized in a bonus event game, such as a “Big Event,” “Grand Event,” or other community event game. As one example, a WMS Gaming-themed roulette wheel (not shown) may comprise a plurality of built-in graphical elements such as the displays noted above. These graphical elements may display a predetermined color (e.g., red, black, green) upon initiation of game play and during game play, but provide a bonus opportunity for changing color after the roulette wheel comes to a stop on a non-winning outcome. Thus, if a player selects green and the roulette wheel comes to a stop on a black, there may exist a possibility that the display element may flip from black to green (or red). In one example of game play, one or more than one graphical elements may be configured to flip colors when the roulette wheel stops. Likewise the same displays may also show numerals. Alternatively, a first graphical element on each arc segment of the roulette wheel displays a color associated with that segment of the wheel and a second graphical element on the arc segment displays a numeral associated with that segment.

As still another example of one type of bonus game play, one or more progressive awards may be associated with various arc segments of the roulette wheel described by way of example above. These graphical elements need not be associated with other outcome determinative aspects of the roulette wheel (i.e., color or numeral) and may be independent therefrom. The graphical elements incorporated into the roulette wheel could, in some aspects, continuously display the progressive award amounts and may optionally comprise, for example, a variable color, hue, text, brightness and/or amount. For example, a roulette wheel may depict the amount of the progressive awards with predetermined color schemes, such as yellow for a first level of progressive award, orange for a second level of progressive award, and white for a third level of progressive award.

In another aspect of one type of game play that might incorporate the malleability of the graphical elements, after the roulette reel stops to reveal the randomly determined outcome, graphical elements may be caused to sequentially display a distinctive color (e.g., white) in a predetermined sequence (e.g., random movement about color displays of the roulette wheel, movement in a clockwise or counterclockwise direction, etc.) until such color stops at a final position. If a player in the bonus game has wagered on the arc segment to which the progressive award is associated, the player wins the progressive award.

A roulette wheel, such as is described above or a conventional style roulette wheel of suitable size may also be utilized in a community event, such as the "Grand Event," in combination with other physical game objects. As one example, the roulette ball itself may comprise graphical elements such as, but not limited to, LEDs, colored LEDs, an OLED display, an AMOLED, an ELD, an e-paper display, a passive or active LCD, a TFT LCD, or the like, that can be controlled either internally by an embedded controller or remotely by controller 34 through a wireless communication path. These graphical elements may be used in any combination, arrangement, or color and are selectively illuminated by either an embedded controller or an external controller 34 in communication with the graphical elements and one or more associated local controller(s), through a wireless communication system (e.g., RF, Bluetooth, etc.). In one aspect, the graphical elements may be embedded within or formed on a cube, sphere, or frame embedded within or comprising a structural component of the roulette ball. Particularly in a robust and an open form factor utilizing LEDs of different colors, the arrangement possibilities are legion.

In operation, the roulette ball would bounce around until finally settling into a slot to reveal a random outcome. The random outcome, in some aspects, could simply comprise a color such as red, black, or green. In various aspects, which could be embodied in a base wagering game or a community event game, such as the Grand Event, the player may either wager on the color and/or numeral and/or any combinations of numbers and colors in an inside or outside bet (e.g., straight, split, street, corner, sixline, even money, group bets, and column bets) and place a side bet on the color of the roulette ball, and variations in the various potential outcomes. For a wagering game embodiment, the pay tables for roulette can then add another layer of potential wagers and combinations. In a bonus game, the various additional levels of matching provided by the physical graphical element embodied in the roulette ball could yield progressively larger bonus awards, could display a multiplier which is multiplied by the numeral associated with the pocket in which the roulette ball lands, or the like. To further heighten excitement, the roulette ball may be configured to change color upon each bounce or impact, using the impulses or accelerations of the impacts to activate a switch (e.g., a pressure activated switch) that cycles the graphical element through a sequence of colors or a controller that randomly selects the next color to display.

In other roulette variants, the graphical elements may comprise displays arranged in or adjacent the slots and being configured to display numerals. The numerals may actually be changed during game play. For example, if a lot of players wager on "18", the green "0" or "00" may suddenly transform to two additional "18s" to the delight and excitement of the players. In another aspect, the green "0" and/or "00" used to give advantage to the house may be replaced by a red or black "0" or "00". The roulette wheel may therefore, on occasion and within the confines of gaming regulation, randomly transform itself in a manner to improve the odds of the players.

In another aspect of the present concepts, continuing with the ball concept, the graphical elements may be embodied in a ball that may be rolled by a player across a game field or a table, such as the field of player-selectable elements 440 presented in the "Grand Event" JACKPOT PARTY® depicted by way of example in FIG. 4. The ball may, again, comprise graphical elements such as, but not limited to, LEDs, colored LEDs, etc., as noted above, that can be controlled either internally by an embedded controller or remotely by controller 34 through a wireless communication path. As one example, the ball may just comprise constant or flashing colored lights, which may include IR lights, that attract attention as the glowing or flashing ball rolls across the game field. In another example, the moving ball may be sensed by sensors 430 (e.g., IR optical sensors or other optical sensor) and, as the ball registers a "hit" on a player-selectable element 440 projected by the overhead device 420, controller 34 may send a wireless signal to a corresponding receiver in the ball to activate an appropriate graphical element switch or to otherwise cause an embedded controller in the ball to cause the graphical elements to light up to a higher intensity and/or change color and/or flash at a particular frequency or in a particular pattern. The colors, intensity of light, and/or flash pattern may optionally correspond to a particular award level or benefit. Correspondingly, the controller 34 causes an appearance of a selected one of the player-selectable elements 440 to change to reveal the outcome associated therewith. In various aspects, a player may get one player-selectable element 440 per roll (e.g., the first encountered player-selectable element) and may optionally receive more than one roll or a player may get all player-selectable elements 440 encountered in a single roll. Optionally, the random outcome(s) to be associated with the next selection(s) of player-selectable elements 440 are predetermined and, rather than being randomly associated with any particular player-selectable element are associated with the sequence of selection of the player-selectable elements.

In yet another aspect, graphical elements may be embodied in a disc or cylindrical object. In this configuration, the graphical elements, which may, again, include graphical elements such as, but not limited to, LEDs, OLEDs, LCDs, TFTs, etc., are advantageously positioned on an upper surface of the disc. In this orientation, the graphical elements will, by virtue of the disc's configuration and stability, always be presented to the gaming system sensor elements (e.g., 430) and will not be obscured by the movement of the disc in that manner that would be caused, for example, by random rotation of a ball. The disc may be caused to move relative to a field comprising a plurality of selectable elements, such as noted above. In other configurations, however, the disc may serve as a player input device, with a rotation of the disc causing a corresponding rotation of another real or virtual object. For example, the sensing element(s) 430 may view a plurality of lights or targets (e.g., IR targets) on the disc and determine a degree of and a direction of rotation of the disc therefrom. This information can then be used to effect movement of another real or virtual object, such as a reel or wheel, in a corresponding fashion. This provides, for example, an interesting control interface wherein a player may control distant objects or graphics using a seemingly innocuous item. Lateral movements in any direction may also be used as control inputs. For example, small lateral movements of the disc or scrolling movements of the disc may be used to scroll through various selectable elements 440, which may be contemporaneously indicated by appropriate highlighting or graphics. When the player has highlighted a desired one of the selectable elements 440, the player may then push a button or click the disc to affirmatively selected the highlighted selectable element.

Continuing with the above example, the disc graphical element advantageously comprises a display-based graphical user interface (e.g., LCD, OLED, etc.) configured to display all of the selectable elements or only a portion of the selectable elements 440. The lateral movements of the disc (i.e., up, down, left, right, etc.) cause the field of view in the display to a desired selectable element(s) 440. Optionally, synchronously with the movement of the disc and display of one or more selectable element(s) 440 on the disc display-based graphical interface, the selectable element(s) 440 in the floor space 410 are highlighted. The player may select a desired one of the selectable element(s) 440 by, for example, rotating the disc clockwise or counterclockwise to correspondingly zoom in and out of the field of selectable element(s) 440. When the disc display shows only a single selectable element 440 for a predetermined period of time, such as 1 or 2 seconds, the controller 34 may accept that selectable element as the player's selection. Alternatively, the player may be required to affirmatively push a button, press down on the disc, or take other action to make the desired selection. In still other embodiments, the control functions described above with respect to a single disc may be distributed amongst two discs, such as a first disc for controlling rotational movement or zooming in or out of a field of view and a second disc for controlling lateral movement of a displayed field of view or of a physical or virtual object.

The disc display may further be adapted to display a scene corresponding to a portion of a table over which the disc is passing, so as to provide the visual effect of a lens or a magnifying glass. For example, a player at a game table may move the disc over the game table and the display shows a virtual representation of the portion of the game table that is beneath the disc display, compete with table-based symbols, lines, and graphics. The virtual representation of the table may be altered, however, to reveal information not on the actual table including, but not limited to, charts, pay tables, general information on the game, a help menu, an attendant call button (e.g., drink ordering), or the like. The disc may include other input devices, such as buttons, that permit the selection of a highlighted item.

In at least some aspects of the present concepts, the player's gaming space may be standardized at each of a plurality of different table games such that a player provided with a disc as a personalized graphical user interface may sit at any gaming table and know that if he or she moves the disc toward and/or over a particular location in the predefined player space, a predetermined function will be activated, such as the display of a specified information, a selectable element, or a plurality of selectable elements (e.g., a menu) on the disc display. For example, a player might know that if he or she moves the disc outwardly and to the right toward a predefined location that a virtual attendant call button is located there and he or she may then select such function. Of course, the disc need not actually display a surface over which the disc is passing, and the disc may, as with other of the above examples, simply provide a display within which the field of view may be selected by lateral and/or rotational movements of the disc. As noted, the player's gaming space may be standardized. However, in other aspects, the player's gaming space may be personalized and attuned to the particular player's needs and physical requirements. Moreover, the player may be further permitted to select from a menu of available functions and spatially orient the functions in any desired position relative to the player's position.

The sensing elements for the above-described disc example need not be sensing devices such as those described above, but may rather include short range sensing devices embedded in or disposed on a game table or a game surface. For example, each desired function desired for a player's space at the gaming table (e.g., attendant call, rules, information, messages, etc.) may be integrated into switches and transmitters/receivers built into the table which are, in turn, connected to a network and are connectable, such as via a wireless connection (e.g., Bluetooth), to the disc. Movement of the disc over the switch causes activation of the switch, such as through the sensing of the disc using an inductive proximity switch, with execution of the corresponding function (e.g., transmission of the switch activation to controller 34, which causes the display of desired information and/or causes the execution of the function). As one example, the function would be the selection of a selectable element (e.g., 440) projected upon an area including the switch such that the activation of the switch logically corresponds to the selection of the selectable element. An associated function flowing therefrom would then include output of instructions from controller 34 to alter, via a projector or overhead device (e.g., 420) a projected image of the selectable element to indicate the selection. Thus, in accord with at least some aspects of the present concepts, sensing of any physical game object(s) 800 within a gaming environment may alternatively be performed by sensing elements disposed in a game surface upon which the physical game object moves, such as by a sensor array in a game floor or game table with spacing or resolution suitable for the intended use of the physical gaming object in the wagering game.

In each of the above-described examples, such as the disc examples, the physical game object comprising a graphical element, may comprise a memory device or data storage medium configured to store data. Thus, a player having a disc, as described above, may have his or her player ID coded into the disc so that when he or she moves from a first table game to a second table game, his or her disc will automatically signal to the table and to the gaming establishment the player's presence at the second table game. The player may then be tracked and appropriately attended to by the gaming establishment staff. Further, a player may elect to have his or her value in chips stored to the disc, while correspondingly being communicated to and backed up in external systems 50, prior to leaving the table. The player may then carry a single physical game object from table to table rather than a stack of chips, case of chips, or overflowing cup of chips. The player may also use the same physical game object to interact with the gaming table, display information to the player, and convey information to and from the gaming establishment. Consistent with the above-described disc example, a graphical element such as an OLED display may be integrated into a much smaller disc-shaped object on the order of size of a poker chip.

It still additional aspects, the physical game objects bearing graphical elements may comprise cards, regular-sized or oversized, that may be played at a regular gaming table. These cards may comprise e-paper or OLEDs, for example, and may utilize, for example, by National Semiconductor Corp.'s PowerWise® power management products such as, but not limited to the National Semiconductor Corp.'s LM4510 OLED display power supply.

It is to be emphasized that, in the embodiments described herein with respect to FIGS. 3-5, for example, the display devices may comprise an array or arrangement (e.g., a path) of standard displays, such as flat panel displays, embedded in a suitable substrate (e.g., on a wall, in a floor, etc.). The interactivity between the player and the gaming environment represented by the plurality of displays is provided via the controller (e.g., 350) and sensing device(s) (e.g., 330), such as is noted above by way of various examples. Still further, the display device(s) 320 may comprise a haptic substrate configured to provide a sensory output (e.g., vibration) to a player, such as is described in WO2007030603, titled "Gaming Machine Having Display With Sensory Feedback" and published on Mar. 15, 2007, which is assigned to the present assignee, is incorporated herein by reference in its entirety. The sensing device(s) may comprise, further to the above examples, a projected capacitance sensor grid, such as is disclosed in U.S. 2006166727, published on Jul. 27, 2006, titled "Gaming machine with proximity-sensitive input device," which is assigned to the present assignee and which is incorporated herein by reference in its entirety.

The display device (e.g., 520) may comprise a Floating Interactive Display, which displays images in mid-air, such as the Heliodisplay manufactured by IO2 Technology of San Francisco, Calif., the Tsunami WaterScreen™ manufactured by AquaMax Laser Display, Inc. of Oak Park, Ill., or the FogScreen™ projection screen manufactured by Fogscreen Inc., of Helsinki, Finland. Thus, although the previously mentioned projection screen may comprise a movable or fixed projection screen (e.g., a vertical painted surface, a white screen, a grey screen, etc.), the projection screen may also comprise a mist, liquid, or non-solid screen.

Still further, although the present examples generally illustrate aspects of the present concepts in relation to a single substrate, any number of substrates are envisaged as being advantageously utilized in accord with the present concepts. For example, a "Grand Event"-style game may utilize not only a floor substrate, but may also include displaying images on all adjacent walls (e.g., four walls) and optionally even the ceiling so as to provide substantial or total sensory immersion.

Additionally, the display devices and substrates are advantageously used for advertising and marketing, such as to promote corporate brands, when the wagering game system is not being used to play a wagering game or associated game for one or more players. Thus, in an example wherein the substrate comprises a floor and the display device comprises a projector, the display device could be configured to project one or more advertisements or other information onto the substrate for viewing by passers-by.

The present concepts also may be independently used by the gaming establishment for promotional offerings. For example, further to the aforementioned used of the present concepts, a gaming establishment may use the devices and methods disclosed herein to, for example, welcome their $1000^{th}$ customer of the day or $500^{th}$ winner of the day by having them walk through a field of JACKPOT PARTY® presents, or the like, that award cash and prizes.

In accord with the above disclosed concepts, the size of the "Grand Event" may be scaled up or down to facilitate a footprint provided by a gaming establishment. In various aspects, the substrate upon which the images are displayed may be truly grand, on the scale of typical grand-prize promotions (e.g., where a car or other luxury item is situated at the center of a bank of slot machines in order to attract players), or larger. The substrate and/or displayed images could alternatively be scaled down to play a small tabletop-style game or may be projected onto a large multi-player or community-sized gaming table. The present systems and methods may thus provide enhanced flexibility and permit the creation of many discrete levels of game play from a single system.

Further, the present concepts, inclusive of the above examples of "Grand Event" games, encourage players who have been invited to participate to stick around for the "Grand Event." Such eligibility, and the corresponding prospects for awards, will motivate players to spend more time in the gaming establishment, gambling or enjoying other features of the gaming establishment (e.g., restaurant, bar, shops, shows, etc.).

Additionally, the substrate, as described above, may be subdivided into a plurality of discrete separate display regions for simultaneous competitive or cooperative play by a plurality of players. Further, a plurality of such systems may be simultaneously employed for individual play or for competitive or cooperative multi-player games.

Each of these embodiments and obvious variations thereof, inclusive of any combination of elements disclosed herein whether or not such combinations are expressly disclosed in combination, is contemplated as falling within the spirit and scope of the claimed invention, which is set forth in the following claims.

What is claimed is:

1. A wagering game system, comprising:

a display device configured to display on a surface a gaming field with a plurality of symbols associated with outcomes of a wagering game, each of the symbols being located at a respective distinct location on said surface, said surface comprising at least one of a floor, a wall, a ceiling, a stage, or a projection screen;

at least one sensing device disposed to detect a player's input to the wagering game, the player's input comprising a player's movement relative to and proximal to the gaming field on the surface from a first location of a first one of the symbols to a second location of a second one of the symbols, the at least one sensing device being configured to output from an associated communication device a signal corresponding to the player's input; and a controller configured to communicate with the sensing device and the display device, the controller being programmed to cause the display device to display on the surface images associated with the player's input responsive to the signal output from the sensing device.

2. A wagering game system according to claim 1, wherein each of the symbols associated with the player's input to the wagering game comprises a respective randomly selected outcome.

3. A wagering game system according to claim 1, wherein the player's input further comprises contact with the surface at the respective location of the symbol corresponding to a desired input.

4. A wagering game system according to claim 3, wherein the at least one sensing device is configured to register the player's input following the player's contact with the surface, for a predetermined period of time, at the respective location of the symbol corresponding to the desired input.

5. A wagering game system according to claim 1, wherein the signal corresponding to the player's input comprises at least one of a directional component, a velocity component, or an acceleration component.

6. A wagering game system according to claim 1, wherein the sensing device comprises an optical sensing device, a magnetic sensing device, or a radio frequency device.

7. A wagering game system according to claim 6, wherein the sensing device comprises at least one of a camera or an infrared camera.

8. A wagering game system according to claim 6, wherein the display device comprises a projector.

9. A wagering game system according to claim 1, wherein the display device is further configured to display in the gaming field a virtual game object associated with the outcomes of the wagering game, the at least one sensing device being further configured to sense a player's movement relative to the virtual game object and output signals indicative thereof, and wherein the controller is further configured, responsive to the output signals, to cause the display device to display the virtual game object moving within the gaming field.

10. A wagering game system according to claim 1, further comprising:

a physical game object comprising one or more graphical elements; and at least one second sensing device configured to sense a state of the physical game object and output signals indicative thereof;

wherein the controller is communicatively connected to the at least one sensing device and further configured to award to the player, responsive to the sensed state of the physical game object, an award corresponding to the sensed state.

11. A wagering game system according to claim 1, further comprising:

a game die comprising a plurality of faces, each face including a respective distinct number of pips; and at least one second sensing device configured to detect a state of the game die, the state representing the respective distinct number of pips of a presented one of the game die faces;

wherein the controller is communicatively connected to the at least one second sensing device and configured to determine, responsive to the detected state of the game die, one or more of the displayed symbols to associate with the player and an award corresponding to the one or more symbols associated with the player.

12. A method of conducting a community-based wagering game event with a gaming system having at least one display device, at least one sensing device, and at least one controller, the method comprising:

displaying, on a surface via the at least one display device, a gaming field with a plurality of symbols associated with outcomes of the community-based wagering game, each of the symbols being located at a respective distinct location on said surface;

sensing a player's movement proximal to the gaming field from a first location of a first one of the symbols to a second location of a second one of the symbols using the at least one sensing device, the player's movement comprising a game input;

outputting to the at least one controller a signal bearing data relating to the player's movement;

determining, using the at least one controller, a spatial relation between the player's movement and the displayed symbols on the surface; and adapting the displayed symbols responsive to the player's movement.

13. A method of conducting a community-based wagering game event according to claim 12, wherein the adapting the displayed symbols further comprises one of revealing a randomly determined outcome, registering a player's input, activating an inactive element of a displayed image, or de-activating an active element of a displayed image.

14. A method of conducting a community-based wagering game event according to claim 12, wherein the adapting the displayed symbols further comprises revealing a randomly determined outcome, and wherein the method further comprises awarding to the player an award corresponding to the randomly determined outcome.

15. A method of conducting a community-based wagering game event according to claim 12, wherein the at least one display device includes a projector, wherein the displaying the gaming field further comprises projecting the plurality of symbols onto the surface using the projector, and wherein the surface comprises at least one of a floor, a wall, a ceiling, a stage, or a projection screen.

16. A method of conducting a community-based wagering game event according to claim 12, wherein the sensing a player's movement using the at least one sensing device further comprises sensing one or more of a location of a player or a player's body part, a velocity of a player or a player's body part, or an acceleration of a player or a player's body part.

17. A method of conducting a community-based wagering game event according to claim 12, wherein the sensing a player's movement using the at least one sensing device further comprises using one or more of a remote optical sensing device, a remote magnetic sensing device, a remote receiver, a signal transmitting device borne by a player.

18. A method of conducting a community-based wagering game event according to claim 17, wherein the optical sensing device, magnetic sensing device, or receiver is used to determine a location of a player's body, location of a player's body part, a velocity of a player's body, a velocity of a player's body part, an acceleration of a player's body, an acceleration of a player's body part, a location of a signal transmitting device borne by a player, a velocity of a signal transmitting device borne by a player, or an acceleration of a signal transmitting device borne by a player.

19. A computer program product comprising one or more non-transitory computer-readable storage media encoded with instructions, the instructions being configured to cause, upon execution by one or more controllers, a gaming system to perform the acts of:

displaying, on a surface via at least one display device, a gaming field with a plurality of symbols associated with outcomes of a wagering game, each of the symbols being located at a respective distinct location on the surface;

sensing, via at least one sensing device, a player's movement proximal to the gaming field from a first location of a first one of the symbols to a second location of a second one of the symbols;

outputting to at least one controller a signal bearing data relating to the player's movement from the first location to the second location;

determining, via the at least one controller, a spatial relation between the player's movement and the displayed symbols on the surface; and adapting the displayed symbols responsive to the player's movement.

20. A method of conducting a wagering game, the method comprising:

conducting a base game of the wagering game at a gaming machine;

qualifying a player to play a bonus game separate from the gaming machine; and conducting the bonus game, the conducting of the bonus game comprising:

displaying, on a surface via one or more display devices, a gaming field with a plurality of symbols associated with outcomes of the bonus game, each of the symbols being located at a respective distinct location on said surface;

sensing a player's movement proximal to the gaming field from a first location of a first one of the symbols to a second location of a second one of the symbols using a remote sensing device;

outputting to a controller a signal bearing data relating to the player's movement, said data comprising location data identifying a location of the player's movement relative to the surface;

using a controller to determine a relation between at least the location data relating to the player's movement and the displayed symbols on the surface; and adapting the displayed symbols responsive to the player's game input.

21. A method of conducting a wagering game according to claim 20, wherein the adapting the displayed symbols further comprises one of revealing a randomly determined outcome, registering a player's game input, activating an inactive element of a displayed image, or de-activating an active element of a displayed image.

22. A method of conducting a wagering game according to claim 20, wherein the adapting the displayed symbols further comprises revealing a randomly determined outcome, and further comprises awarding to the player an award corresponding to the randomly determined outcome.

23. A method of conducting a wagering game according to claim 20, wherein the surface comprises one or more of a floor, a wall, a ceiling, a horizontal surface, a vertical surface, an inclined surface, an elevated horizontal surface, an elevated inclined surface, or an elevated vertical surface.

24. A wagering game system, comprising:

one or more projectors configured to project a gaming field with a plurality of symbols onto a floor, the plurality of symbols including first and second player-selectable symbols each being associated with a respective randomly determined outcome of a wagering game and each being located at a respective distinct location within the gaming field;

one or more motion sensing devices configured to sense movements of a player within the gaming field relative to the first and second player-selectable symbols, the one or more motion sensing devices being configured to output signals indicative of the movements of the player within the gaming field; and one or more controllers communicatively connected with the one or more projectors and the one or more motion sensing devices, the one or more controllers being configured to, responsive to movement signals indicating the player's interaction with at least one of the player-selectable symbols, cause the one or more projectors to modify the gaming field to indicate a selection of the at least one player-selectable symbol and award an award corresponding to the selection of the at least one player-selectable symbol.

25. A method of conducting a wagering game with a gaming system having one or more projectors, one or more motion sensing devices, and one or more controllers, the method comprising:

displaying, on a floor via the one or more projectors, a gaming field with a plurality of symbols, the plurality of symbols including first and second player-selectable symbols each being associated with a respective randomly determined outcome of the wagering game and each being located at a respective distinct location within the gaming field;

sensing, via the one or more motion sensing devices, movements of a player within the gaming field relative to the first and second player-selectable symbols;

outputting from the one or more motion sensing devices to the one or more controllers signals indicative of the movements of the player within the gaming field;

determining, via the one or more controllers, movement signals indicating the player's interaction with at least one of the player-selectable symbols; and in response to movement signals indicating the player's interaction with at least one of the player-selectable symbols, modifying display of the gaming field to indicate a selection of the at least one player-selectable symbol and awarding an award to the player corresponding to the selection of the at least one player-selectable symbol.

* * * * *